United States Patent
Hurry

(10) Patent No.: US 7,983,994 B2
(45) Date of Patent: Jul. 19, 2011

(54) MODULE ID BASED ENCRYPTION FOR FINANCIAL TRANSACTIONS

(75) Inventor: Simon J. Hurry, Foster City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 12/247,225

(22) Filed: Oct. 8, 2008

(65) Prior Publication Data

US 2009/0144202 A1 Jun. 4, 2009

Related U.S. Application Data

(60) Provisional application No. 60/991,146, filed on Nov. 29, 2007, provisional application No. 61/012,378, filed on Dec. 7, 2007.

(51) Int. Cl.
G06Q 20/00 (2006.01)
G06Q 30/00 (2006.01)
(52) U.S. Cl. ............................................. 705/72; 705/73
(58) Field of Classification Search .................... 705/72, 705/73
See application file for complete search history.

(56) References Cited

U.S. PATENT DOCUMENTS

| | | | | |
|---|---|---|---|---|
| 5,398,285 A | * | 3/1995 | Borgelt et al. | ................... 380/30 |
| 5,592,212 A | | 1/1997 | Handelman | |
| 5,592,611 A | * | 1/1997 | Midgely et al. | .................... 714/4 |
| 5,745,576 A | * | 4/1998 | Abraham et al. | ................ 705/73 |
| 5,794,207 A | | 8/1998 | Walker et al. | |
| 5,825,884 A | * | 10/1998 | Zdepski et al. | .................. 705/78 |
| 5,915,093 A | | 6/1999 | Berlin et al. | |
| 6,014,636 A | | 1/2000 | Reeder | |
| 6,085,168 A | | 7/2000 | Mori et al. | |
| 6,098,879 A | | 8/2000 | Terranova | |
| 6,105,008 A | * | 8/2000 | Davis et al. | ..................... 705/41 |

(Continued)

FOREIGN PATENT DOCUMENTS

JP 2002-183442 A 6/2002

(Continued)

OTHER PUBLICATIONS

IPSec. Juniper Networks, Inc. Retrieved from Internet Archive Wayback Machine, available at <http://web.archive.org/web/20030912201348/http://www.juniper.net/techpubs/software/erx/erx50x/erx-product-overview/html/routing-protocols-overview4.html>. Archived Sep. 12, 2003.*

(Continued)

*Primary Examiner* — Andrew J. Fischer
*Assistant Examiner* — Christopher C. Johns
(74) *Attorney, Agent, or Firm* — Kilpatrick Townsend & Stockton LLP

(57) ABSTRACT

A server is operable to receive a media device identifying number (ID) and establish an association between a media device and a payment account and, in one embodiment, supports at least one of payment authorization and payment clearing based at least in part on the media device ID and the payment account. A network and system includes a payment card processor server that is operable to receive a payment authorization request and to determine if an authorized media device generated a purchase selection message and to determine to approve a received payment authorization request based, in part, if the media device was authorized for the purchase selection based upon a received media device ID. The system is further operable to perform a key rotation to protect payment account information.

16 Claims, 18 Drawing Sheets

U.S. PATENT DOCUMENTS

| | | | |
|---|---|---|---|
| 6,219,692 B1* | 4/2001 | Stiles | 709/201 |
| 6,223,209 B1* | 4/2001 | Watson | 709/201 |
| 6,298,373 B1* | 10/2001 | Burns et al. | 709/203 |
| 6,327,578 B1 | 12/2001 | Linehan | |
| 6,367,011 B1 | 4/2002 | Lee et al. | |
| 6,370,580 B2* | 4/2002 | Kriegsman | 709/226 |
| 6,618,858 B1 | 9/2003 | Gautier | |
| 7,107,248 B1 | 9/2006 | Asokan et al. | |
| 7,155,411 B1 | 12/2006 | Blinn et al. | |
| 7,249,097 B2 | 7/2007 | Hutchinson et al. | |
| 7,349,871 B2* | 3/2008 | Labrou et al. | 705/26.35 |
| 7,404,202 B2 | 7/2008 | Hamilton et al. | |
| 7,512,567 B2 | 3/2009 | Bemmel et al. | |
| 7,571,139 B1 | 8/2009 | Giordano et al. | |
| 7,578,439 B2 | 8/2009 | Graves et al. | |
| 7,606,560 B2 | 10/2009 | Labrou et al. | |
| 7,607,583 B2 | 10/2009 | Berardi et al. | |
| 7,707,412 B2* | 4/2010 | Nyberg et al. | 713/168 |
| 7,849,307 B2* | 12/2010 | Roskind | 713/155 |
| 2002/0034304 A1 | 3/2002 | Yang | |
| 2002/0065743 A1 | 5/2002 | Bates et al. | |
| 2002/0107016 A1 | 8/2002 | Hanley | |
| 2003/0066091 A1 | 4/2003 | Lord et al. | |
| 2003/0097571 A1 | 5/2003 | Hamilton et al. | |
| 2004/0024702 A1 | 2/2004 | Angel et al. | |
| 2004/0039648 A1 | 2/2004 | Candelore et al. | |
| 2004/0122685 A1 | 6/2004 | Bunce | |
| 2004/0193553 A1 | 9/2004 | Lloyd et al. | |
| 2004/0195316 A1 | 10/2004 | Graves et al. | |
| 2005/0027543 A1* | 2/2005 | Labrou et al. | 705/1 |
| 2005/0051619 A1* | 3/2005 | Graves et al. | 235/380 |
| 2005/0138429 A1* | 6/2005 | Miura | 713/201 |
| 2005/0209975 A1* | 9/2005 | So et al. | 705/71 |
| 2005/0210251 A1* | 9/2005 | Nyberg et al. | 713/169 |
| 2005/0268107 A1 | 12/2005 | Harris et al. | |
| 2006/0089843 A1 | 4/2006 | Flather | |
| 2006/0122945 A1* | 6/2006 | Ripberger et al. | 705/71 |
| 2006/0178988 A1 | 8/2006 | Engendorf | |
| 2006/0206709 A1 | 9/2006 | Labrou et al. | |
| 2006/0249576 A1 | 11/2006 | Nakada et al. | |
| 2007/0107016 A1 | 5/2007 | Angel et al. | |
| 2007/0107017 A1 | 5/2007 | Angel et al. | |
| 2007/0118887 A1 | 5/2007 | Roskind | |
| 2007/0138261 A1 | 6/2007 | Flinchem | |
| 2007/0187492 A1 | 8/2007 | Graves et al. | |
| 2007/0192207 A1 | 8/2007 | Poltorak | |
| 2008/0052180 A1 | 2/2008 | Lawhorn | |
| 2008/0052183 A1* | 2/2008 | Hobson et al. | 705/26 |
| 2008/0077956 A1 | 3/2008 | Morrison et al. | |
| 2008/0203172 A1* | 8/2008 | Berardi et al. | 235/492 |
| 2008/0273704 A1* | 11/2008 | Norrman et al. | 380/278 |

FOREIGN PATENT DOCUMENTS

| | | | |
|---|---|---|---|
| KR | 10-2006-0104147 A | 10/2002 | |
| KR | 10-2003-0094710 A | 12/2003 | |
| KR | 10-2004-0084505 A | 10/2004 | |
| WO | WO 2009/148865 A2 | 12/2009 | |

OTHER PUBLICATIONS

An Illustrated Guide to IPSec. Friedl, Steve. 2005.. Available from <http://unixwiz.net/techtips/iguide-ipsec.html>.*

Morris Sloman, ed. Network and Distributed Systems Management. Addison-Wesley Publishing Co.,Wokingham, England, 1994, Front matter, back matter, and chapter 3 included.*

Rankl, Wolfgang et al. Smart Card Handbook, $2^{nd}$ Edition. Wiley, New York, 2000. Chapters 3 and 4, front matter included.*

"Track Format of magnetic stripe cards." Last updated 12 Dec. 200. Located at <http://www.gae.ucm.es/~padilla/extrawork/tracks.html>.*

How to Activate Windows XP. Microsoft Corporation. Stored in Internet Archive Wayback Machine, Oct. 28, 2004. Available at <http://web.archive.org/web/20041028043333/http://support.microsoft.com/kb/307890>.*

Inside Windows Product Acticiation. Fully Licensed GmbH. Jul. 2001. Available from <http://www.licenturion.com/xp/fully-licensed-wpa.txt>.*

International Search Report and Written Opinion mailed on Dec. 31, 2009 for Patent Application No. PCT/US2009/045066, 12 pages.

Office Action of Mar. 5, 2010 for U.S. Appl. No. 12/247,227, 19 pages.

Fulong, Julia, "UNC's Dance Marathon compares favorably with others", The Daily Tar Heel, Feb. 28, 2005, 3 pages.

Hafner, Katie, "Will that be Cash or Cell Phone?; Wireless Payment Systems Might Mean Dialing [Into] Your Own Wallet", The New York Times, Mar. 2, 2000, 4 pages.

Mangalindan, M., et al., "You've Got Money: Paying via Text Message", The Wall Street Journal, Apr. 26, 2006, 4 pages.

Wired Magazine, "U.S. Plays Dumb with Smart Cards", Aug. 22, 2001, 2 pages, available from the internet at http://www.wired.com/techbiz/media/news/2001/08/46242.

Office Action for U.S. Appl. No. 12/129,396 of Jul. 7, 2010, 19 pages.

Office Action, Interview Summary of Jun. 7, 2010 for U.S. Appl. No. 12/247,227, 4 pages.

Derfler, F., et al. , How Networks Work, Millennium Edition, Que Publishing, 2000, 9 pages.

McKenna Findlay, Andrea., "In store deployments of Web-based kiosks are bringing in clicks closed to the bricks", Internet Retailer Magazine, Apr. 2001, 3 pages.

Office Action of Dec. 16, 2010 for U.S. Appl. No. 12/129,396; 12 pages.

Office Action of Nov. 15, 2010 for U.S. Appl. No. 12/247,227; 25 pages.

Office Action of Nov. 9, 2010 for U.S. Appl. No. 12/129,470; 12 pages.

Office action of Oct. 27, 2010 for U.S. Appl. No. 12/247,223; 6 pages.

Advisory Action of Feb. 16, 2011 for U.S. Appl. No. 12/129,396; 5 pages.

Non-Final Office Action of Feb. 3, 2011 for U.S. Appl. No. 12/247,223; 26 pages.

Final Office Action of Mar. 29, 2011 for U.S. Appl. No. 12/129,470; 17 pages.

* cited by examiner transaction
authorization system 10 system 80

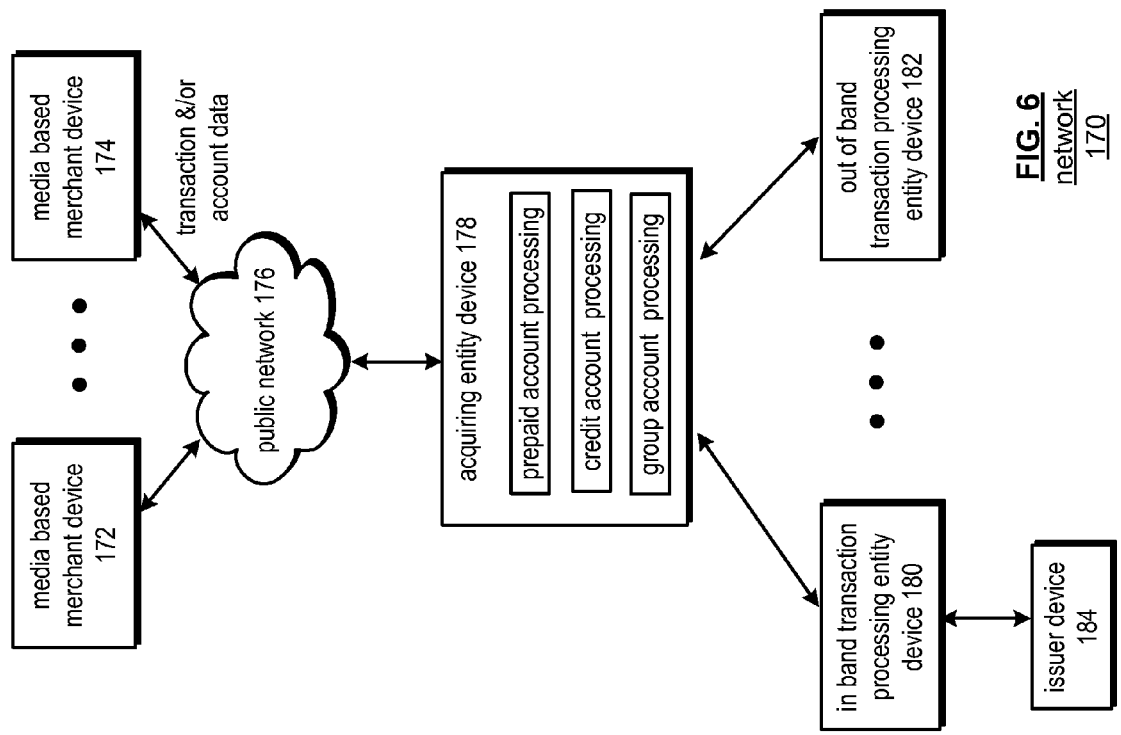
FIG. 6 network 170
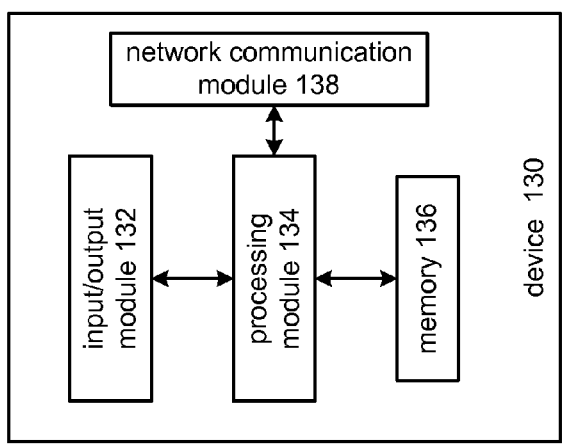
FIG. 4
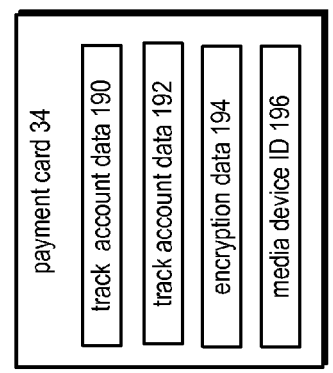
FIG. 7 network 140 system 200 system 250 system 310 system 350 system 500 system 600

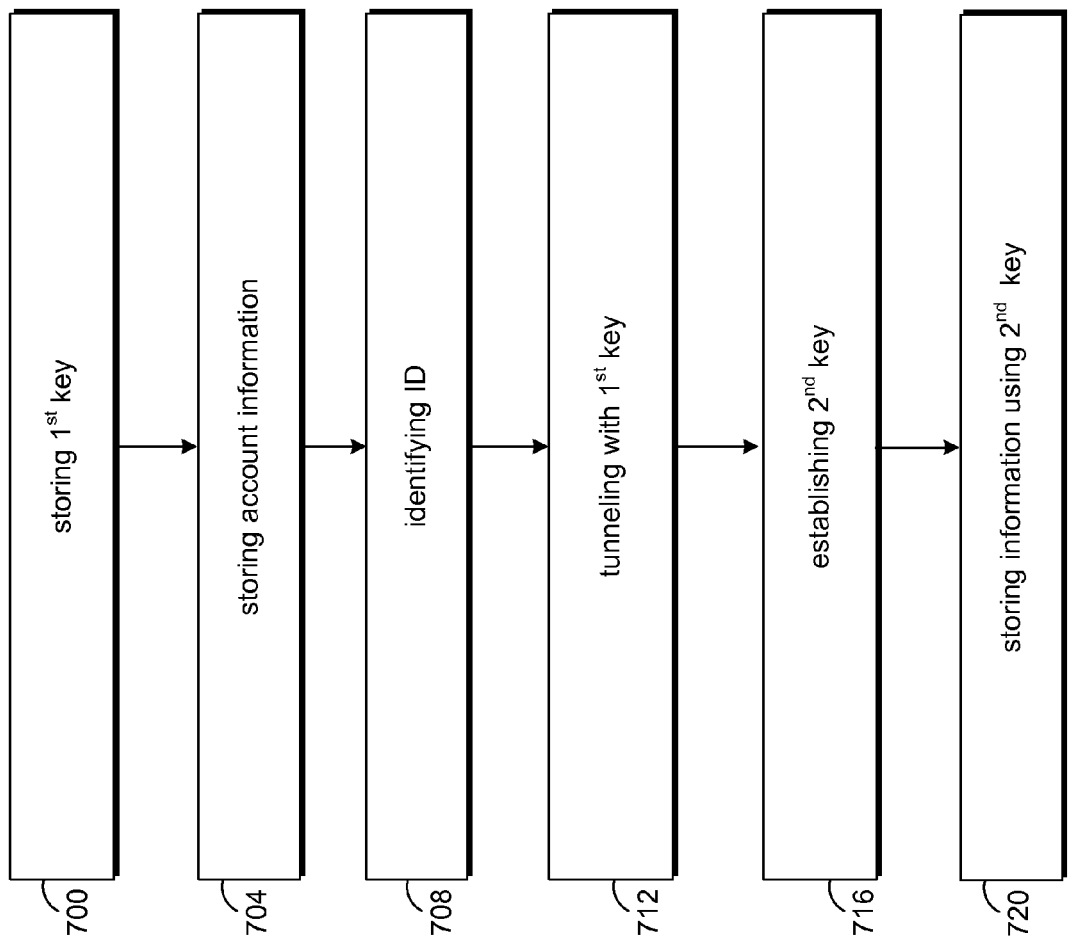

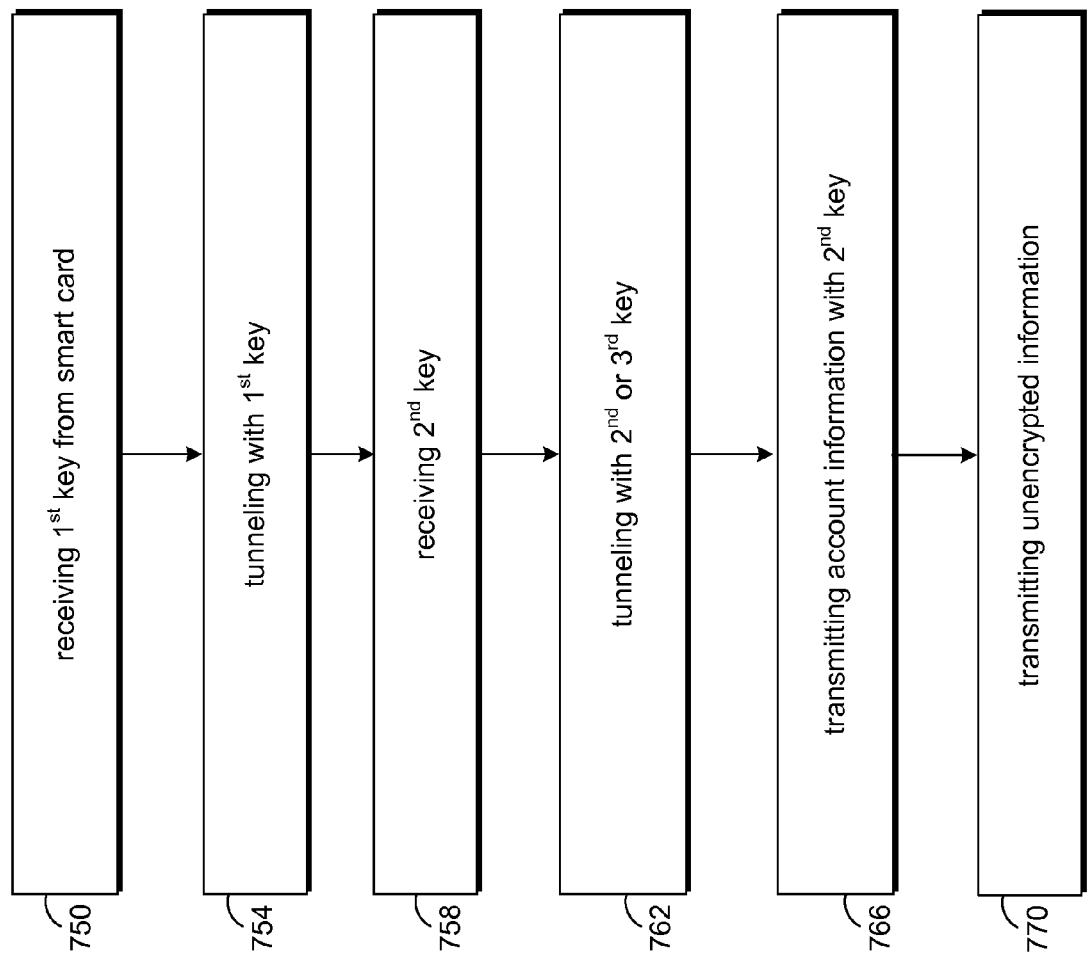

MODULE ID BASED ENCRYPTION FOR FINANCIAL TRANSACTIONS

CROSS-REFERENCE TO RELATED PATENTS

The present U.S. Utility patent application claims priority pursuant to 35 U.S.C. §119(e) to the following U.S. Provisional Patent Applications which are hereby incorporated herein by reference in their entirety and made part of the present U.S. Utility patent application for all purposes:
1. U.S. Provisional Application Ser. No. 60/991,146 entitled "IPMD Payments Remote Control Personalization," filed Nov. 29, 2007, pending.
2. U.S. Provisional Application Ser. No. 61/012,378, entitled "IPMD Payments Remote Control Personalization and Protection," filed Dec. 7, 2007.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

1. Technical Field of the Invention

The present invention relates to systems, devices and method that facilitate electronic commerce transactions.

2. Description of Related Art

Consumers, product and service merchants, purchasing and sales agents, suppliers, manufacturers, credit card and debit card companies and banks have all seen process improvements including improved payment processes due to advances in electronic commerce technology. Buyers can now find desired products through Internet searches and can purchase goods and services through secure online channels. Transactions may be processed almost instantly leading to faster delivery of the purchased item, media content, or service.

One aspect of such transactions is the common concern of theft of payment account information. Accordingly, e-commerce systems typically include, when the user chooses to make a purchase, the establishment of an encrypted tunnel between the merchant and the customer so that payment account information may be transmitted safely. Typically, a secure page is provided to the customer to prompt the customer to enter a payment account number and other required account information. A merchant server then validates the account information as a part of completing the transaction. Thereafter, a purchase confirmation is generated in one of a variety of formats to the customer.

In addition to the advances in e-commerce, the Internet is also changing the way that television is being watched. As Internet storage capacity and throughput have increased, and user terminal memory and data processing technology has advanced, media servers now deliver streaming video at a data rate that provides resolution and quality comparable to broadcast/cable/satellite television. Media servers now transmit streaming video having content similar to that provided by prior television services.

Along similar lines, Internet Protocol television boxes have been developed that support the display of streamed media and other data received over the Internet on a television. Accordingly, the manner in which television and other media content are delivered may undergo a dramatic change and may even result in a decoupling of program scheduling and viewer enjoyment. Moreover, the interactive nature of personal computers and other Internet Protocol based systems may allow for more interaction between a user and the media and advertisements viewed on a display device.

As is known, advertisements displayed on a computer terminal include tags that are used to track user interest and to give credit to a particular web page provider for generating a positive response to the advertisement. While television advertisements are unidirectional broadcasts and provide no direct feedback that allows a merchant or television broadcaster to determine consumer interest, Internet based advertisements are interactive as associated scripts are operable to indicate whether a user selected an advertisement for closer review and even whether the user purchased a product in response to the advertisement using the e-commerce transaction technology mentioned before. E-commerce and its payment processes, however, are currently setup to only support transactions that result from shopping activities in a physical or virtual store that often result from the unidirectional broadcast advertisements and web-based product and service searches.

FIG. 1 is a functional diagram that illustrates a payment card authorization process that can support a typical e-commerce transaction according to the prior art. As may be seen, a cardholder initially presents a payment card to a merchant. Specifically, the card is presented to a point of sale terminal or, as described previously, the account information is presented to the terminal through secured data entry over the Internet. Thereafter, the merchant produces card and payment information to an acquirer server. An acquirer is a payment card association member that initiates and maintains relationships with merchants that accept payment cards. Thereafter, the acquirer server produces an authorization request to a payment card company for review. The payment card company then sends the authorization request for review to the appropriate payment card issuer. The payment card issuer then issues an approval or denial that is propagated back to the merchant.

BRIEF DESCRIPTION OF THE SEVERAL VIEWS OF THE DRAWINGS

FIG. 4 is a functional block diagram of a device 130 that is operable operations and functionality as described in relation to the various aspects of the embodiments of the invention.

FIG. 6 is a functional block diagram of a computer network operable to support payment authorization processing according to one embodiment of the invention.

FIG. 7 is a functional block diagram of a payment account according to one embodiment of the invention.

FIGS. 19-20 are flow charts that illustrate method steps for establishing encryption keys according to a plurality of embodiment of the invention.

DETAILED DESCRIPTION OF THE INVENTION

Figure 2:
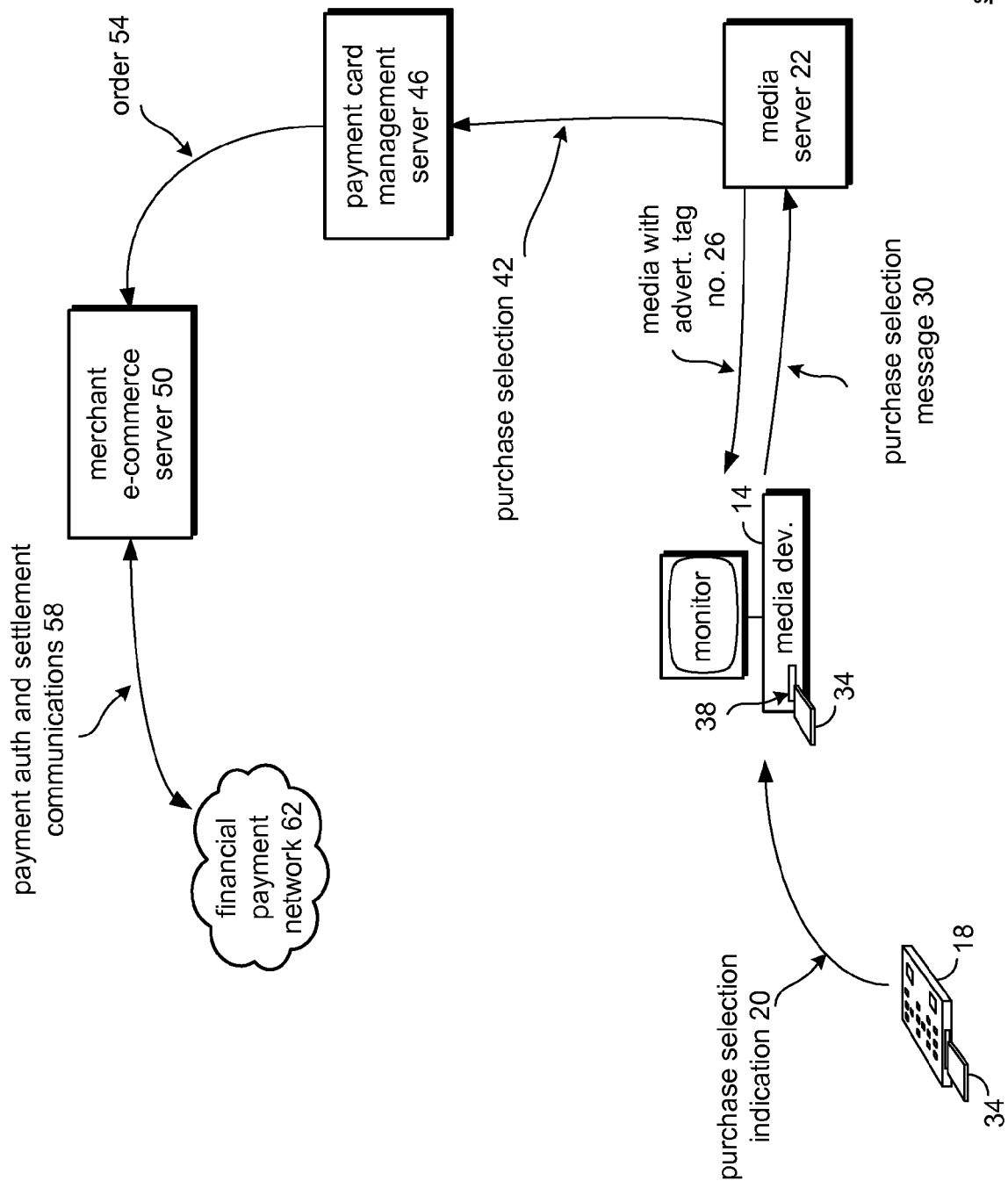
FIG. 2 is a functional block diagram of a system 10 that illustrates a process flow for a system to implement a "buy it now" feature according to one embodiment of the invention.

FIG. 2 is a functional block diagram of a system 10 that illustrates one embodiment of a process flow for a system to implement a "buy it now" feature. The "buy it now" feature supported by the systems, networks, devices and methods of the various embodiments of the invention allow a user to initiate a purchase of an advertised item by interaction with a media device that has an established association with a payment account without requiring the user to manually enter necessary payment account information. Merely pressing the "buy it now" button triggers an authorization and subsequent settlement process based upon stored payment account information that is associated with the media device. The media device may be a cable television set top box, a satellite television set top box, an IP television (IPTV) set top box, a personal or laptop computer, or an IP game box capable playing interactive games over the Internet. Any device such as an IPTV set top box, IP game box or other device operable to receive media over the Internet is included in references to IP media devices (IPMDs, media devices).

To achieve this functionality, devices, systems, networks, and/or associated method steps generally support a process to generate a payment account that has an established association with a specific media device. References herein to a media device are references to any type of device that can communicate over an IP network, a public network including the Internet, cable TV, satellite TV networks, and other types of networks that support data communications. The payment accounts may be card based in the form of a plastic bank card, a smart card, a dedicated SIM card, or may be in an electronic format and not require a physical form factor (i.e., electronically stored and encrypted account information). Additionally, while the embodiments shown typically refer to a hardware media device it should be understood that a software based module that operates with generic hardware (for example, a personal computer) may serve as the media device described that supports operation described in relation to at least one of the embodiments of the invention.

Generally, the system and processes described with reference to FIG. 2 illustrate a process that with which a set top box or other media device supports a purchase transaction using a "buy it now" operation, e.g., button selection, wherein the purchase transaction is made by an authorized media device.

More specifically, the system 10 includes a media device 14 that communicates over a wireless communication link with remote control 18 (though a remote control is not required) to receive a purchase selection indication 20 from remote control 18. Generally, purchase selection indication may comprise a signal in any form including one that includes a defined message. Media device 14 is operably coupled to receive streaming media content from a media server 22 and to provide content interaction indications to media server 22 based on receiving purchase selection indication 20. For example, the content interaction indications may include user activation of a "buy it now" feature (generically, a "purchase selection") for products, services and media advertised within the media content.

Media device 14 may be coupled to receive the media content over a computer network, a data packet network, a cable network, a satellite network, or a traditional broadcast television network. Media device 14 may also receive, simultaneously or separately, media via a plurality of transmission channels. For example, media server 22 may receive broadcast television programming over a cable network cable connection or as a wireless broadcast transmission received via an antenna. The media server 22 may convert the received broadcast transmission programming to a packet format for delivery to media device 14 via a data packet network or a computer network. In addition, media server 22 may deliver media received from other media sources to media device 14 over the data packet network or the computer network.

Media server 22 produces media with advertising and other purchase options (collectively "advertisement") with a tag number 26 to media device 14 for display upon an associated monitor or display. A purchase selection by the user by interaction with remote control 18 in response to an advertisement results in media device 14 generating a purchase selection message 30 that includes tag number 26 identifying a specific advertisement or media source. In the described embodiment, remote control 18 includes a dedicated button, the so called "buy it now" button that, when depressed, prompts remote control 18 to transmit signals to further prompt media device 14 to transmit purchase selection message 30 as a purchase selection indication.

Payment account information is stored by a smart card 34 that is inserted or installed into a receiving port 38 of media device 14. The payment account information includes traditional payment card data such as track 1, track 2, track 3, magnetic stripe equivalent data (MSD), or payment data conforming to the Europay MasterCard Visa (EMV) specifications identifying information of a traditional payment card magnetic strip. As is known by one of average skill in the art, a traditional payment card magnetic strip includes a plurality of tracks of data, while smart card based payment cards may additionally include MSD or EMV data. One particular prior art format includes three tracks wherein the data on tracks 1 and 2 is formatted by most cards in a consistent manner to improve global readability while track 3 data has not been implemented in such a constant format. Here, tracks are not used as such data is stored in memory.

The type of data from the common formats for track 1 and track 2, however, are exemplary of the data stored within smart card 34. The types of data stored by smart card 34 may include the magnetic stripe equivalent data of Track 1 and Track 2 (MSD) or a payment account number, account or card expiration date, usage limits including purchase amounts or totals, a permanent ID of an authorized device that has an established association with the payment account, issuer ID, payment account processor ID, and personal identification number. Additionally, in one embodiment, a user mailing address and a user billing address is included. The payment account processor is a company that processes payment account transactions. Historically, such processing has been on the behalf of payment card issuer companies such as banks and other financial institutions. Accordingly, media device 14 is operable to retrieve the account information from smart card 34 and to produce the payment account information within message 30.

Generally, a form factor and associated interface of smart card 34 and port 38 may include any known topology or structure including wireless communication interfaces. For example, smart card device 34 in FIG. 2 may comprise a contactless device using any known wireless radio transceiver circuitry including wireless local area network circuitry, personal area network circuitry, radio frequency identification (RFID) circuitry, etc. The receiving port in media device 14 would include a compatible transceiver circuitry. Any known protocol may be used to support such wireless interface. For example, the smart card 34 and the receiving port 38 may include logic and circuitry to support a contactless protocol such as a near field communications (NFC) protocol. One particular protocol, for example, includes the ISO/IEC Joint Technical Committee1 protocol known as ISO/IEC 14443. Thus, wireless communication link may be used to communicatively couple smart card 34 to media device 14 to allow media device 14 to receive payment account information from smart card 34. Moreover, while the described embodiment includes the media device 14 having port 38 to receive smart card 34 with the payment account information, it should be understood that an alternate embodiment includes remote control 18 having a port to receive the smart card 34. As with the media device 14, a port within remote control 18 may also be of any known topology or structure.

In an alternate embodiment in which a payment account is not associated with a physical form factor such as a plastic credit card or SIM card, a payment account secured software module may be installed into the media device to support the "buy it now" feature. In such case, the media device 14 or remote control 18 may be uniquely identified to support the "buy it now" feature.

The media device 14 includes an identifying number that is a permanent identification number of the media device 14. For example, the media device 14 identifying number may be a serial number assigned to media device 14. One aspect of this identifying number is that the number is non-modifiable. In an alternate embodiment in which a media device comprises a software based module containing the payment account information (for example, one installed in a personal computer), the media device identifying number is a non-modifiable identification number associated with the software based media device.

In response to receiving purchase selection message 30, media server 22 transmits message 42 to a payment card management server 46. Message 42, which operates as a purchase selection indication, includes the media device ID, tag number 26, and the payment account information. Message 42 may be the same as purchase selection message 30 or may be different but based upon message 30. Message 42 may include additional information such as a shipping address associated with the payment account. Payment card management server 46 then determines a corresponding merchant e-commerce server 50 based upon the tag number and transmits an order 54 to merchant e-commerce server 50. Here, order 54 is one for which payment has not yet been authorized or approved. Merchant e-commerce server 50 then engages in payment authorization and settlement communications 58 with a financial payment network 62 to complete the transaction and, more specifically, to initially receive payment authorization and subsequently payment settlement.

Figure 3:
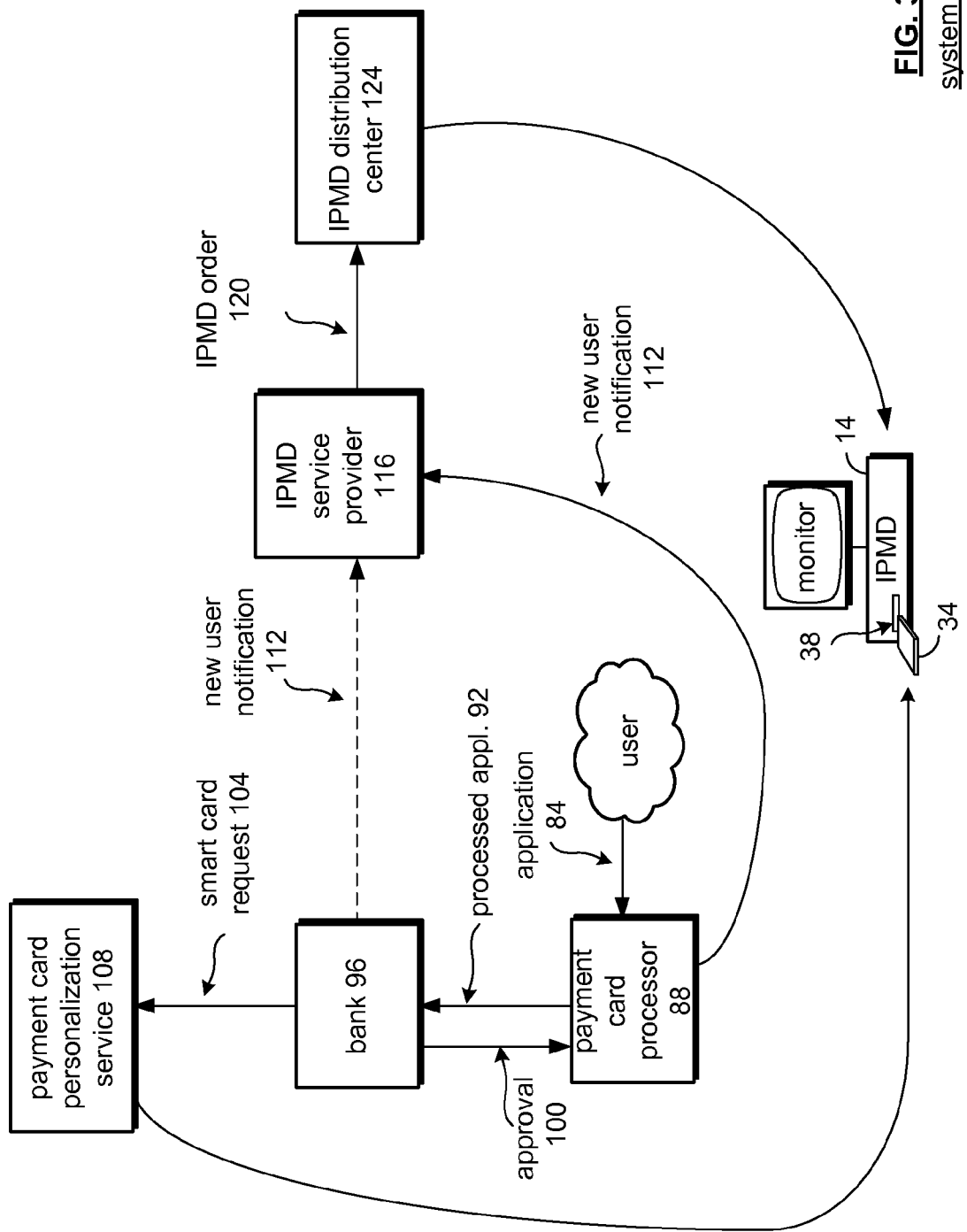
FIG. 3 is a functional block diagram of a system for establishing an established association between a media device and a payment account according to one embodiment of the invention.

FIG. 3 is a functional block diagram of a system 80 that illustrates a process for creating an established association between an authorized media device and a payment account according to one embodiment of the invention. The figures and corresponding text are directed to a media device that is capable of receiving data and communicating over at least one of a plurality of network types. In one specific embodiment, media device 14 (as described here in FIG. 3) is an IP media device (IPMD). Alternatively, the media device may be an IP television (IPTV) set top box. Additionally, in the described embodiment of FIG. 3, the payment account is associated with a smart card 34 produced in the form of a smart card. Generally, a process of system 80 supported according to an embodiment of the present invention is one that establishes an association between a user payment account and an authorized media device, such as media device 14. After such association is made, an IPMD wherein purchase selection messages may only be made for the specified user account by the authorized media device 14.

The process begins with a user generating an application 84 for a new payment account and producing the application 84 to a payment card processor 88. Payment card processor 88 is, for example, a credit card company that processes credit cards for issuer companies such as banks and other financial institutions or for the bank itself. In general, references herein to "payment card processor" are references to payment card processing entities or companies. The user may utilize a web based interactive program or may physically deliver a paper application to the payment card processor 88, which then produces processed application 92 in an electronic form to bank 96 for processing. Processed application 92 is based on application 84.

While the example of FIG. 3 illustrates the user providing the application directly to payment card processor 88, it should be understood that the user may also deliver the application to any other entity that subsequently provides the application to the payment card processor 88 including bank 96 and an IPMD service provider. Accordingly, payment card processor 88 generates a processed application 92 to bank 96. Bank 96 then approves or denies processed application 92.

Upon approving processed application 92, bank 96 generates an approval 100 to payment card processor 88. Bank 96 also generates a smart card request 104 to payment card personalization service 108. Upon receiving approval 100, payment card processor 88 generates a new user notification 112 to IPMD service provider 116. In an alternate approach, bank 96 generates and transmits new user notification 112 to IPMD service provider 116 after bank 96 approves processed application 92. IPMD service provider 116 then transmits an IPMD order 120 to IPMD distribution center 124. IPMD distribution center 124 then ships an IPMD to the user. Finally, during this process, payment card personalization service 108 ships smart card 34 for insertion into port 38 of IPMD 14. In the embodiment in which the IPMD comprises an IPTV set top box, for example, IPMD distribution center 124 sends the IPTV set top box to the user.

In one embodiment of the invention, smart card 34 includes a serial number or other identification number of media device 14. This serial number is a non-modifiable number and is hardware based. Accordingly, subsequent purchase orders can only be approved if the ID number stored on the smart card and the ID of the media device match when a purchase selection is made by an authorized media device in one embodiment of the invention. The process includes media server service provider 116 producing the hardware ID number to either bank 96 or payment card processor 88 for delivery to payment card personalization service 108. In general, the ID of the authorized media device must match the ID of a media device that generates a purchase selection message for an account having an established association with the media device before a purchase approval can be generated.

Figure 1:
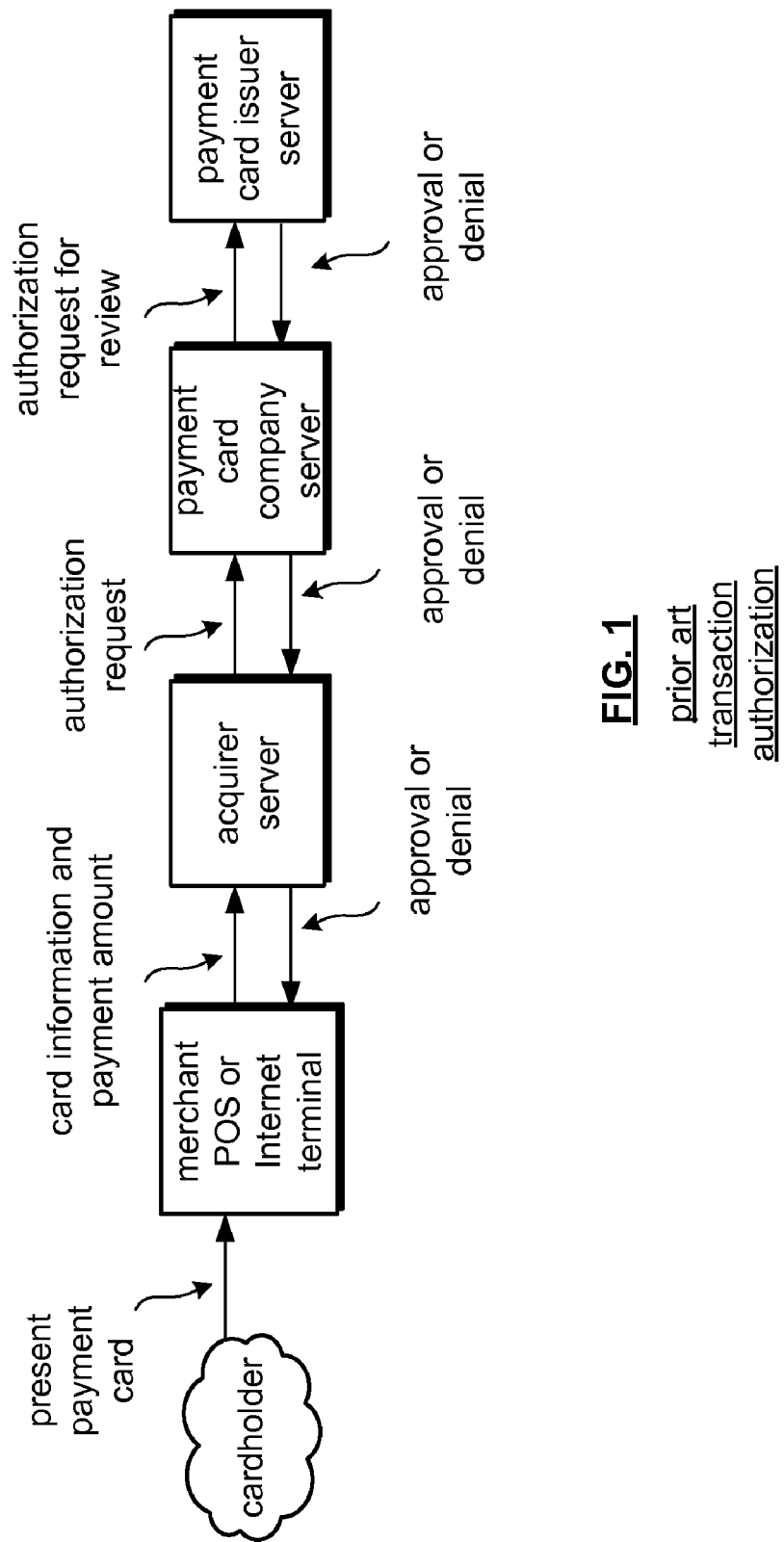
FIG. 1 is a functional diagram that illustrates a payment card authorization process that can support a typical e-commerce transaction according to the prior art.

Payment card personalization service 108 is, in one embodiment, an element of a network operable to generate personalized smart cards that include account information as well as encryption keys and other information to support the creation of secure smart cards. For example, U.S. Pat. No. 6,367,011 to Lee et al. provides details of one smart card personalization system which, as shown in FIG. 1 of Lee et al., includes elements at the issuer location as well as elements at a "personalization location."

The methods and apparatus of the embodiments of the invention are applicable to Internet based media devices that operably couple to an associated media server from which media content or associated products or services may be purchased over a public network. For example, the concepts herein are applicable to game systems such as the Sony Wii™, Gamecube™, and XBOX™ and other similar systems. Generally, though, media content and advertisements for products and services are produced to a display device to allow a user to make purchases associated with the media content and advertisements merely by pressing the so called "buy it now" button on a remote control, a dedicated button on the system, or a so called "soft button" of a graphic display. A display for displaying media with advertising may comprise any known display device including television sets, traditional monitors, LCD displays, or projectors. These displays may be separate or integrated into the media device. For example, the display may be an LCD screen of an audio player such as an MP3 player. Many such systems include an ability to communicate over an IP network though the ability to communicate over an IP network is not required. Generally, the embodiments include any system that is operable to deliver media to the user device and to receive a purchase indication from the user device through the same or a different network while a purchase transaction is pending.

FIG. 4 is a functional block diagram of a device 130 that is operable to perform the operations and functionality as described in relation to the various aspects of the embodiments of the invention. For example, device 130 may be used to receive and process an application for a payment account that is to be associated with media device 14 according to one embodiment of the invention. While device 130 is described as a device for processing an application for a payment account, the structure and functionality of device 130 may be applied to each computer device or server described here in this specification in relation to prior and subsequent figures. Device 130 includes an input/output module 132 operable to receive user inputs from a keyboard, mouse and other user input devices and further to generate display signals and/or audio signals for display on a display device and for playing sound through a speaker system, respectively, to create a user interface with device 130. As such, device 130 is operable to receive an application directly from a user in addition to receiving the application over the Internet. A processing module 134 is operable to communicate with input/output module 132 and to process incoming signals based upon user input and upon signals received over the Internet. Memory 130 is operable to store computer instructions and data.

The processing module 134 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information.

Note that when the processing module 134 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 2-3 and in the Figures that follow FIG. 4.

Continuing to refer to FIG. 4, processing module 134 of device 130 is operable to retrieve computer instructions from memory 136 which instructions define operational logic of device 130 including logic for performing the method steps of at least one embodiment of the invention described herein this specification. For example, the logic defined by the computer instructions support application processing for payment accounts that will be associated with a media device. Finally, processing module 134 is operable to engage in wireless and wired communications through various data packet networks and wireless communication networks via network communication module 138 to support the various method steps described herein.

More specifically, processing module 134 is operable to communicate with the input/output module 132, network communication module 138, and memory 136 to execute the computer instructions stored within memory 136. Based upon at least one of the stored data in memory 136, the received data from network communication module 138, and the user data entry received from input/output module 132, processing module 134 is operable to receive and process an application for a media device associated payment account, transmit an approved application indication, and support or establish an established association between the payment account and media device 14.

Figure 5:
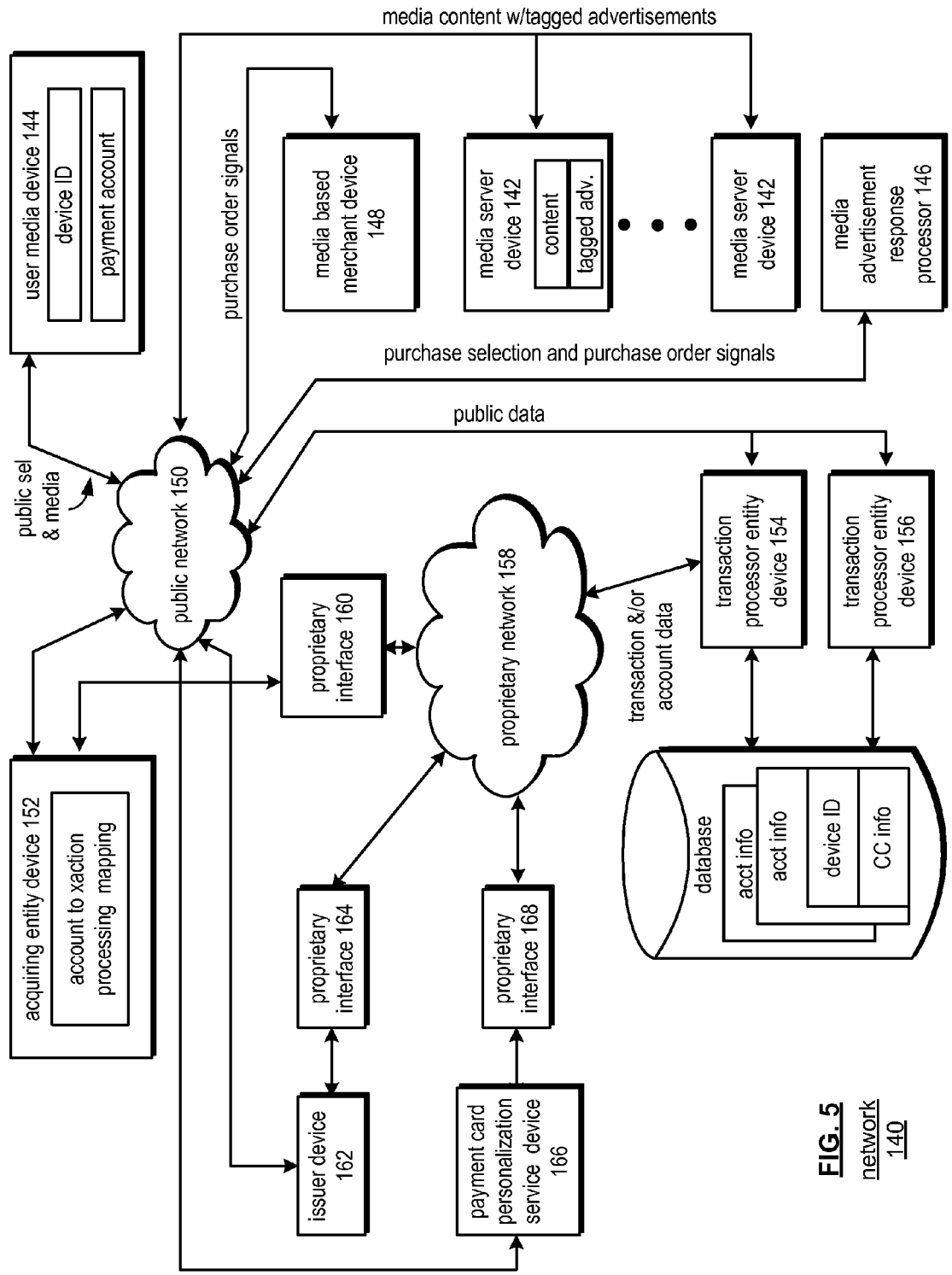
FIG. 5 is a functional block diagram of a network operable for establishing and supporting electronic transactions according to one embodiment of the invention.

FIG. 5 is a functional block diagram of a network operable for establishing and supporting electronic transactions according to one embodiment of the invention. Network 140 generally comprises financial network devices that interact with media service provider devices, merchant devices and user media devices having an ability to establish and subsequently support a purchase selection. More specifically, the network elements or devices of network 140 are operable to initially support creation of personalized payment cards and to subsequently support electronic transactions using the payment cards. In at least one embodiment, the payment cards are smart cards have a form factor similar to subscriber identity module (SIM) cards in that they may be received by SIM card reader to communicate with a computer or other device that has a port or interface to communicate through a SIM card reader with the smart card. In one particular embodiment, through not required, the smart card is formed as an actual SIM card.

In yet another embodiment, a contactless form factor may be used for the smart card. For example, a form factor may include circuitry that supports communication using Near Field Communication (NFC) or ISO14443 as well as other wireless communication circuitry (e.g., wireless local area network protocol circuitry such as an I.E.E.E. 802.11 protocol or a personal area network protocol such as Bluetooth™. Generally, such wireless communication circuitry supports establishing wireless communication links between the smart card and other devices such as the associated media device or even a payment card company server.

Here, the payment card, with associated payment account track 1-3 type data, as well as other information, may be encrypted and protected by the smart card. In one embodiment, the data is partially encrypted to allow access to certain types of data while protecting other types of information. Examples of payment data which may be fully protected, partially protected or not protected all according to implementation include payment account number, expiration date, usage limits including purchase amounts or totals, a permanent ID of an authorized device that has an established association with the payment account, issuer ID, payment account processor ID, and personal identification number. One aspect of network 140 is that network 140 is operable to support an application and account creation process that results in a payment account having an established association with a specified user media device from which a user may initiate purchase transactions using the payment account.

Network 140 includes a media server device 142, a user media device 144, a media advertisement response processor 146, and a media based merchant device 148 that are all coupled to communicate through one or more public networks 150. Media server device 142 is operable to provide media content and tagged advertisements to user media device 144.

Media server device 142 can be, for example, a device that delivers media by way of wireless communication channels and/or wired networks. The wireless networks can comprise the wireless cellular networks, satellite based wireless networks, or even public wireless local area networks and wireless wide area networks. The wired networks can be any known technology including cable networks for delivering so called broadcast television programming content, the public switched telephone networks, or computer and data networks such as Internet Protocol networks. According to implementation, these various types of networks can be used either for delivery of media content, delivery of communication messages that support an electronic transaction, or both. For example, one type of network may be used for delivering the media content while another is used to conduct purchase related communications. Alternatively, one type of network may be used for both.

Continuing to refer to FIG. 5, network 140 includes an acquiring entity device 152 of a payment card acquirer company that is operable to communicate with media based merchant device 148 over public network 150 as well as with a payment account processor entity device 154 or 156 of a payment account processor company by way of a proprietary network 158. Acquiring entity device 152 includes a mapping of user payment accounts with transaction processing entities such credit card processing companies.

A proprietary interface 160 is utilized to enable acquiring entity device 152 to communicate through proprietary network 158. An issuer device 162 also is coupled to communicate through both the public network 150 and through proprietary network 158 by way of interface 164. Similarly, a payment card personalization service device 166 is coupled to communicate through both the public network 150 and through proprietary network 158 by way of interface 168. Finally, as shown, each transaction processor entity device 154 is operable to communicate with one or more databases that include payment account information and a permanent ID of a module or media device from which authorized purchase transactions may be initiated.

In operation, media server device 142 is operable to produce media with a tag number for identifying items or services that may be purchased by a user. Accordingly, user media device 144 is operable to receive and play the media content for advertisements or advertised items. Media device 144 is also operable to produce purchase selection indications to media server device 142 with the advertisement tag number to identify the advertisement that corresponds to the purchase selection indications. In an alternate embodiment, the purchase selection indications are produced to media advertisement response processor 146. Here, a first type of public network delivers media to user media device 144 and a second type of network delivers user media device responses to media server device 142 or to media advertisement response processor 146. A public network 150 is used for delivery of the media content though a private network may be used instead.

Once either device 142 or 146 receives a purchase selection indication, device 142 or 146 is operable to forward the purchase selection indication to merchant device 148 over public network 150. Merchant device 148 is then operable to generate and provide a purchase authorization request to acquiring entity device 152. Acquiring entity device 152 then forwards the purchase authorization request to a transaction processor entity device 154 by way of proprietary network 158. The transaction processing entity device then performs several authorization processing steps including evaluating account standing and verifying that all authorization associated data appears to be proper according to implemented guidelines. Transaction processor entity device 154 then forwards the authorization request to a payment account issuer device 162. Payment account issuer device then makes a final authorization decision to approve or deny the authorization request.

User media device 144 is operable to provide payment account information and an ID of user media device 144 along with the purchase selection indication. Accordingly, at least one of the media server device 142, the media advertisement response processor 146, the acquiring entity device 152 and the issuer device 162 is operable to compare the user media device ID to the payment account information as a part of determining whether to approve (or forward) the authorization request.

Media server device 142 is operably disposed to communicate through public network 150 with merchant device 148 that is identified by the tag number of an advertisement. Merchant device 148 is further coupled to communicate over public network 150 with acquiring entity device 152 to initiate transaction approval and settlement processing. Generally, acquiring entity device 152 is operable to receive the authorization request for a purchase transaction and to communicate with at least one device in a financial network through a proprietary interface and/or network to request and receive a purchase authorization approval.

An additional aspect of the operation of network 140 is that any of devices 142, 148, 154 and 162 is operable to provide account application information including at least a portion of an account number directly or indirectly to payment card personalization service device 166. Payment card personalization service device 166 is operable to receive the permanent ID of user media device 144 to embed the permanent ID within the data stored within the payment card. For example, the ID may be stored in an encrypted form in a smart card along with other account information to create an established association between the account and the user media device 144.

In an alternate embodiment, an established association between the account and the user media device may be created through an initial communication. Here, devices 154 and 162 are operable to establish a common encryption key with one of user media device 144 or smart card 34 installed within user media device 144 to generate an encryption key for protecting data in purchase transactions initiated by the (authorized) user media device. This encryption key is then used to protect at least a portion of the account information. Accordingly, the encrypted portion of the account information will only be properly decrypted if an authorized ID is provided as a part of a purchase selection since the provided ID will be used to select an encryption key for a received authorization request. In general, a user media device ID is transmitted as a part of or in association with a purchase selection and, if the ID is one that has an established association with the payment account identified in the transaction and/or account data, then the transaction may be approved or forwarded to a different device for approval.

FIG. 6 is a functional block diagram of a computer network 170 operable to support payment authorization processing according to one embodiment of the invention. A plurality of media based merchant devices 172-174 are each operable to generate and provide transaction and/or account data and to transmit such data through a public network 176 to an acquiring entity device 178. Acquiring entity device 178 is then operable to provide the transaction and/or account data to an in-band processing entity device 180 or to an out of band transaction processing entity device 182. Here, in-band processing entity device 180 is further operable to provide the transaction and/or account data to an issuer device 184.

The transaction and/or account data is transmitted as a part of an authorization request for approval of a pending purchase selection. The transaction and/or account data includes an ID of a user media device that generated the purchase selection request. The acquiring entity device 178 comprises a plurality of processing modules including, in the described embodiment, a prepaid account processing module, a credit account processing module, and a group account processing module.

Based upon the transaction and/or account data, a corresponding module of the modules of device 178 process the transaction and/or account data to determine which processing entity device should receive the transaction and/or account data. For example, for a credit account or group account, an in-band processing entity such as entity 180 may be the device to which the transaction and/or account data should be transmitted. Similarly, for a prepaid account, the prepaid account processing module may determine that an out-of-band transaction processing entity such as entity 182 should receive the transaction and/or account data. Generally, FIG. 6 illustrates that a single acquiring entity device may interact with a plurality of merchant devices 172-174 as well as a plurality of processing entity devices 180-182.

Any one of acquiring entity device 178, in-band transaction processing entity device 180, out-of-band transaction processing entity device 182, or issuer device 184 is operable to determine if the permanent ID of the media device that transmitted the purchase selection indication is one that corresponds to and is authorized to initiate purchase selections for the payment account identified by the payment account information. Such a determination may be made based upon an established association between the payment account and the device ID in a plurality of described approaches.

FIG. 7 is a functional block diagram of a payment card according to one embodiment of the invention. Payment card 34 is a smart card and includes a plurality of magnetic stripe equivalent (MSD) data blocks including track account data blocks 190-192, an encryption data block 194 and a media device ID data block 196. Any or all of the MSD data blocks 190-196 may be encrypted or may include encrypted data. The "track account" data (i.e., magnetic stripe equivalent data) of blocks 190-192 is merely the type of data that has historically gone into so called track 1, track 2, or track 3 of a magnetic strip of a payment card. Here, two track account data blocks are provided in which one includes encrypted data and one includes unencrypted data though the payment card may including additional account data blocks. Encryption data block 194 includes an encryption key for encrypting data and/or for encrypted communications between the smart card (payment card 34) and another device such as a processing entity device 180 or issuer device 184. In one embodiment, a smart card personalization service creates a unique derived key from a master key that is stored within encryption data block 194. If the master key is altered in a subsequent process, the new unique derived key is stored within encryption data block 194. Media device ID block 196 includes a media device ID that was received by the smart card personalization service for associating with a payment account. In one embodiment of the invention, the unique derived key is derived using the media device ID 196 as derivation data.

Figure 8:
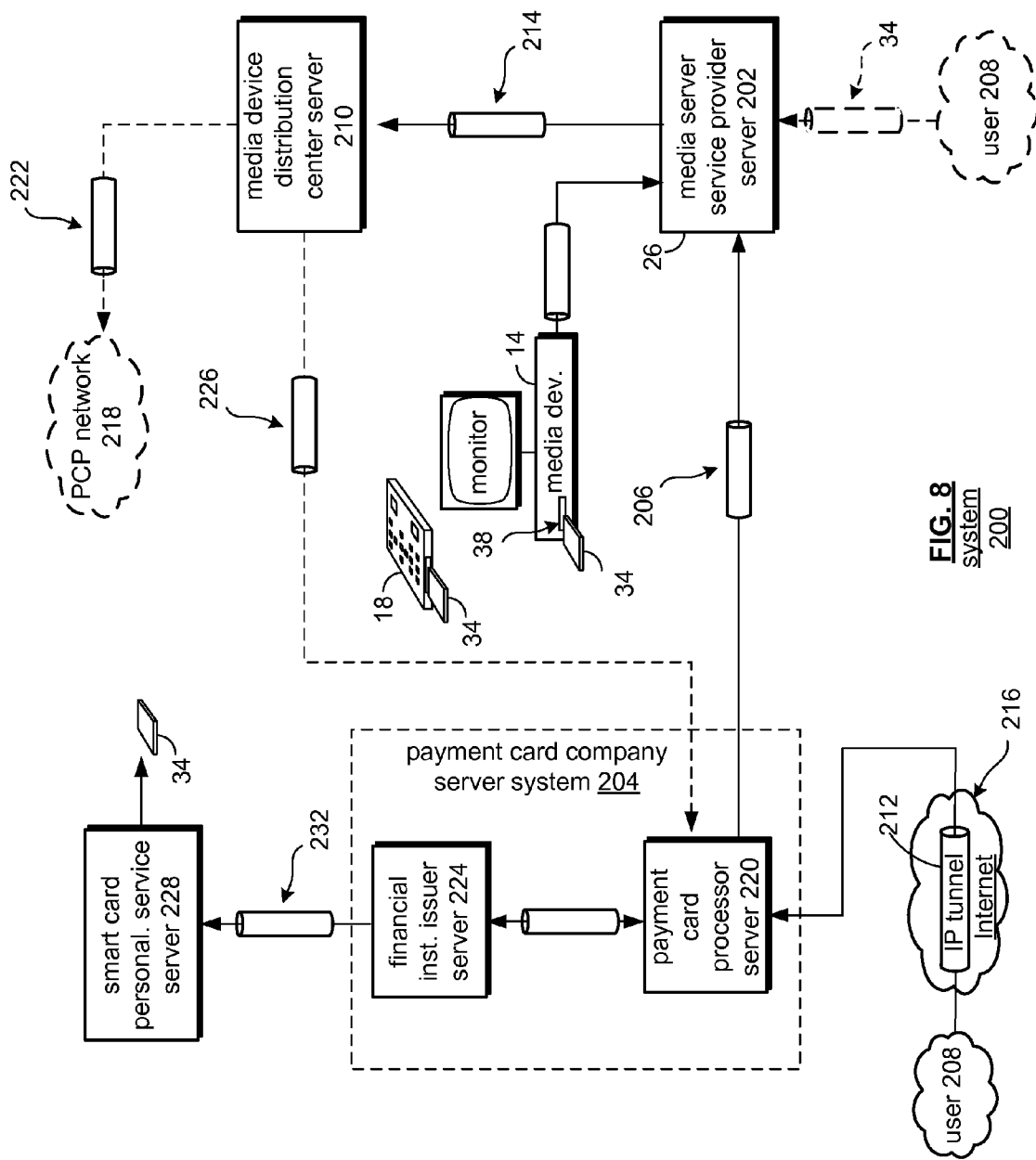
FIG. 8 is a functional block diagram of a computer system that illustrates a process for creating an established association between a payment account and a media device according to one embodiment of the invention.

FIG. 8 is a functional block diagram of a computer system 200 that performs an exemplary process for creating an established association between a payment account and a media device according to one embodiment of the invention. Referring now to FIG. 8, payment card company server system 204 is operable to communicate with a user 208 to receive a payment account application that is to be associated with media device 14. For exemplary purposes, user 208 is coupled to and communicates with payment card processor server 220 through a secure IP tunnel 212 over a data packet network such as the Internet 216. Alternatively, user 208 may enter such application using a keyboard, mouse, and display coupled to payment card processor server 220 or to financial institution issuer server 224.

Secure IP tunnel 212 is an encrypted communication that is transmitted through wired and/or wireless communication paths within one or more data packet networks such as the Internet. Any known technology for securing data packet transmissions through wired and wireless communication links may be included. Hereinafter, all references to secure IP tunnels and/or secure communication channels should be understood to refer to encrypted and protected communication through at least one of a wired or wireless network and may include encrypted transmissions through known data packet networks such as Internet 216. Moreover, in the embodiments that follow, it should be understood that at least a portion of the payment account related data is encrypted whether or not shown or described in relation to the figures in addition to encryption of communications between devices.

Payment card company server system 204 includes at least one of a payment card processor server 220 and a financial institution issuer server 224. Generally, the various embodiments of network 200 and, more specifically, payment card company server system 204 may include a single payment card processor server 220, a single financial institution issuer server 224, or both. In an embodiment that comprises both, payment card processor server 220 communicates with financial institution issuer server 224 over a secure IP tunnel.

In system in which payment card company server system 204 includes only one server 220 or 224, either server 220 or 224 performs the same basic tasks of receiving and approving applications and supporting the creation of a smart card based payment account that is to have an established association with a media device 14. Thus, it may be seen that either a payment card processor company, for example, Visa, Inc., or a financial institution, may perform all of payment account application processing that has historically been performed jointly by both institutions. Accordingly, in the various embodiments of the invention, a system 200 may comprise one processor server 220, one issuer server 224, or both to support the creation of a payment account that is to have an established association with a media device 14 as an authorized media device. Payment card processing server system 204 therefore reflects any of these embodiments. Generally, supporting the creation of a smart card based payment account includes any of the steps or transmission of any of the messages described herein for system 204 or for servers 220-224.

Payment card processing server system 204 is therefore operable to generate an approved indication to a smart card personalization service server 228 over a secure IP tunnel 232 after the application has been approved. Each smart card personalization server such as smart card personalization server 228 is similar to payment card personalization service 108 of FIG. 3 in that server 228 may represent but one element of a system that supports smart card creation and personalization. The approved indication includes payment account information that is to be embedded within a smart card 34 generated by smart card personalization service server 228.

Payment card processing server system 204 is also operable to transmit a media device new user account indication to a media device service provider server 202 over a secure IP tunnel 206 through a data packet network or other public network such as the Internet. Media server service provider server 202 is then operable to transmit an order to media server distribution center server 210 over secure IP tunnel 214. In response, media server distribution center server 210 prompts the mailing or delivery of a media device to user 208. Additionally, in one embodiment, media server distribution center server 210 is operable to produce the media device identifying number for the media device being sent to user 208 to one of payment card processing network 218 over secure IP tunnel 222 or to payment card company server system 204 by way of secure IP tunnel 226. This identifying number is transmitted to support subsequent payment authorization and settlement processes that evaluate a media device user payment account in relation to the media device identifying number and, more generally, to support the creation of an established association between media device 14 and the payment account for user 208.

If the media device identifying number is produced to payment card processing server system 204 by server 210 and not to PCP network 218, in an alternate embodiment, then payment card processing system server system 204 is operable to distribute the media device identifying number to PCP network 218 as necessary to support payment authorization and settlement processes. For example, payment card processing system server 204 is operable to transmit the media device identifying number and at least a portion of the associated media device payment account information to at least one of a transaction authorization network server to support the authorization of transactions based in part upon the media device identifying number and/or to a settlement processing network server to support the settlement of transactions based in part upon the media device identifying number.

Figure 9:
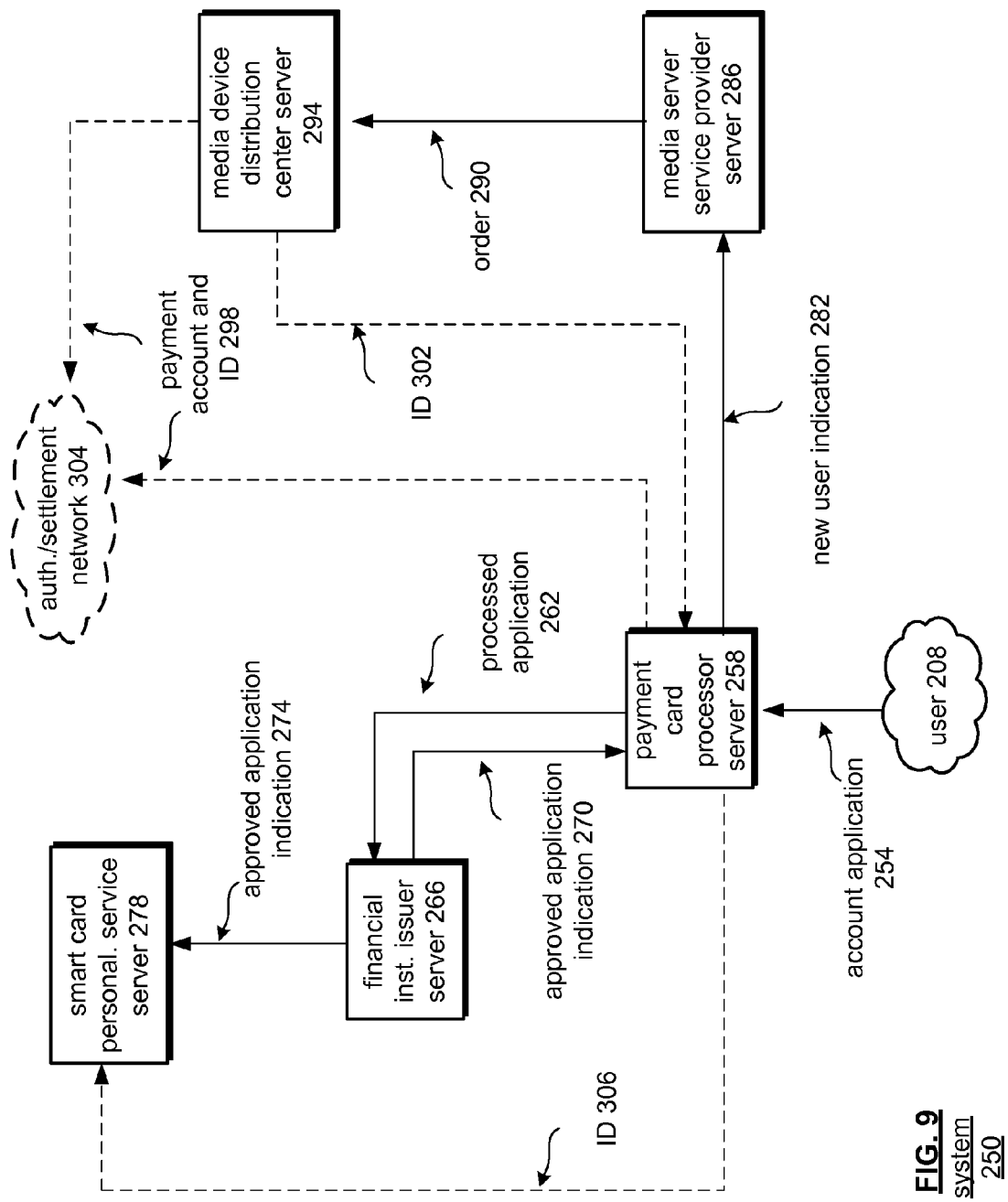
FIG. 9 is a functional block diagram of a computer system that includes a payment card company server and a financial institution issuer server that jointly support creating an established association between a payment account and a media device according to one embodiment of the invention.

FIG. 9 is a functional block diagram of a computer system 250 that includes a payment card processor server 258 and a financial institution issuer server 266 that jointly support creating an established association between a payment account and a media device according to one embodiment of the invention. A user 208 provides a media device payment account application 254 to payment card processor server 258 for a payment account for use in association with a media device such as media device 14 of the prior figures. The application may be provided through manual entry or in an electronic form, through a computer network or Internet connection as described in relation to FIGS. 3-5 and 7-8. Payment card processor server 258 then generates message 262 which includes processed media device payment account application to financial institution server 256.

Processed media device payment account application 262 is based upon the media device payment account application 254 and may include additional information such as an application reference number or other application identifying information. The information is provided in a defined format to enable financial institution issuer server 266 to receive and further process the application. A flexible extended markup language type protocol may be used, for example, for the defined format.

Financial institution issuer server 266 then generates message 270 which includes an approved media device payment account application indication to payment card processor server 258. This indication in message 270 may be based upon a user input. For example, a credit or loan officer of the financial institution may approve the application and enter such approval to allow financial institution issuer server 266 to transmit message 270. Alternatively, logic executed by financial institution issuer server 266 allows, at least in some conditions, for approval of the media device payment account processed application of message 262.

The approved media device payment account application indication in message 270 specifically includes the application reference number or identification information. Additionally, financial institution sever 266 also generates message 274 which includes the approved media device payment account application indication to smart card personalization service server 278 to facilitate creation of a smart card based user smart card payment account. The approved media device payment account application indication of message 274 includes a user 208 mailing address as well as additional user 208 payment account information to allow smart card personalization service server 278 to prompt a mailing of a generated smart card with the user 208 payment account information to user 208.

Payment card processor server 258 generates message 282 which includes a media device payment account new user indication to media server service provider server 286. Media server service provider server 286 then generates media device order in a message 290 to media device distribution center server 294. Media device distribution center server 294, in response to receiving message 290, initiates a delivery or mailing of a media device 14 to user 208. Additionally, in one embodiment, media device distribution center server 294 then produces message 298 which includes media device payment account information and the media device ID to authorization and settlement network elements or devices of authorization and settlement network 304. The authorization and settlement network 304 is similar to and may include one or more of the financial network elements or devices of FIG. 5 to support, as necessary, the established association between payment accounts and media devices. Media device distribution center server 294 is also operable to provide the media device ID in message 302 to payment card processor server 258 to allow payment card processor server 258 to take one or more subsequent steps to create the established association between the media device based on the media device ID received in message 302 with the user 208 payment account.

Payment card processor server 258, for example, may subsequently transmit message 298, in an embodiment in which server 294 does not generate message 298, to authorization and settlement network elements of authorization and settlement network 304. Additionally, payment card processor server 258 is operable to produce the media device ID in a message 306 to smart card personalization service server 278 to enable smart card personalization service server 278 to include the media device ID of message 306 within the user 208 payment account information to support creating the established association between the payment account and media device 14. Message 306 may include additional information to enable smart card personalization service server 278 to associate the media device ID to the correct payment account. An encryption key may also be provided by server 278 for storing in smart card 34. Additionally, in one embodiment, the payment account information is provided to server 278 in an encrypted form for storing in smart card 34.

Figure 10:
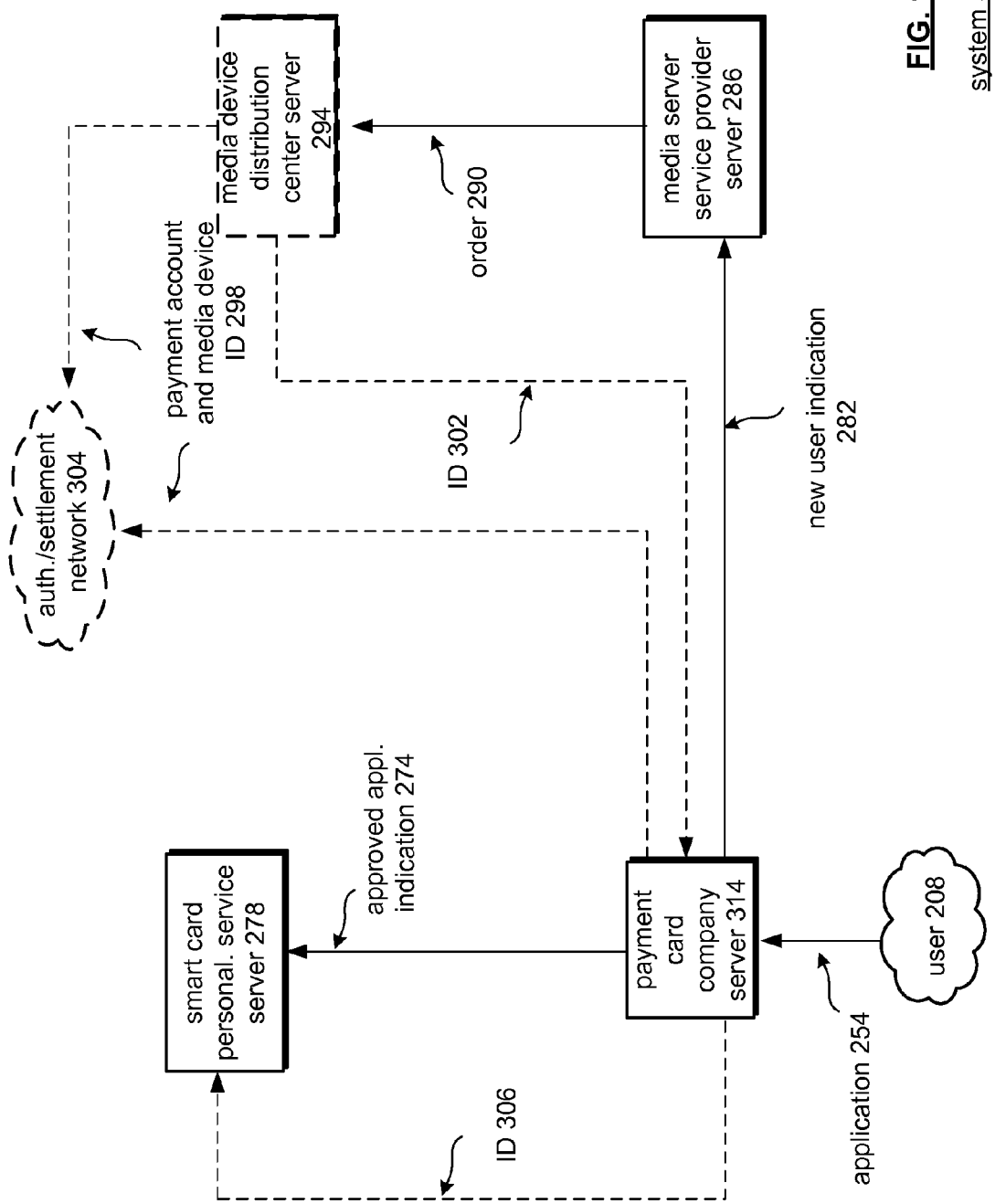
FIG. 10 is a functional block diagram of a computer system that includes a payment card company server operable to support creating an established association between a payment account and a media device according to one embodiment of the invention.

FIG. 10 is a functional block diagram of a computer system 310 that includes a payment card company server 314 operable to support creating an established association between a payment account and a media device according to one embodiment of the invention. In general, references herein to "payment Card Company" are intended to relate to companies that serve in the role of a payment card processing company such as a credit card processing company, or to a payment card issuer such as a bank or other financial institution, or to a combination of an issuer and a processing company. Accordingly, a payment card company server such as server 314 is one that is capable of performing functionality of any issuer server and/or any payment card processor server and represents one or more servers.

Returning to FIG. 10, a user 208 provides a media device payment account application 254 to payment card company server 314 for a payment account for use in association with a media device such as media device 14. Payment card company server 314 is operable to support approval of the media device payment account application and then to generate message 274. Message 274 includes an approved application indication and is transmitted to smart card personalization service server 278 to facilitate creation of a smart card that includes payment account information.

The approved application indication of message 274 includes a user 208 mailing address as well as additional user 208 payment account information. This allows smart card personalization service server 278 to prompt a mailing of a generated smart card with the user 208 payment account information to user 208. This indication of message 274 may be based upon a user input wherein, for example, an approval of the application by a credit or loan officer of the financial institution. Alternatively, the indication of message 274 may be based upon logic executed by a payment card company server that allows, at least in some conditions, for approval of an application based upon the data provided within a media device payment account application.

Payment card company server 314 also generates message 282 which includes a media device payment account new user indication to media server service provider server 286. Media server service provider server 286 then generates media device order in message 290 to media device distribution center server 294. Media device distribution center server 294 then initiates a delivery or mailing of a media device 14 to user 208. Additionally, in one embodiment, media device distribution center server 294 then produces media device payment account information and a media device ID in message 298 to authorization and settlement network elements of authorization and settlement network 304. Media device distribution center server 294 is also operable to optionally provide the media device ID in message 302 to payment card company server 314. Payment card company server 314 is operable to then take one or more subsequent steps to create an established association between the media device and the user 208 payment account.

Payment card company server 314, for example, may subsequently transmit payment account information and the media device ID in message 298 to authorization and settlement network elements of authorization and settlement network 304 in place of server 294 sending message 298. Additionally, payment card company server 314 may produce the media device ID in message 306 to smart card personalization service 278. This enables smart card personalization service server 278 to include the media device ID received in message 306 within the user 208 payment account information to support approval and settlement processes that are based upon both user account information and an ID of a media device server 14. Message 306 includes the media device ID in message 302 and may also include additional information to enable smart card personalization service server 278 to associate the media device ID to the correct payment account.

The operation performed in relation to FIG. 10 and its description herein may be modified, for example, by substituting payment card company server 314 with a financial institution issuer server 266, for example, wherein financial institution issuer server 266 performs all of the steps and message transmissions described for payment card company server 314. Here, the financial institution server operates as payment card company server 314. Accordingly, for such an embodiment, any reference to payment card company server 314 includes financial institution issuer server 266.

In current processes, the roles of the payment card processor company and financial institution are distinct and thus a process as illustrated in relation to FIG. 9 may be implemented. If payment card processor companies and financial institutions expand their roles to overlap with tasks traditionally performed by the other, then an embodiment of the invention similar to that described here in FIG. 10 could be realized. The payment card company server may be a part of a network or system of any entity that enters the space of issuing payment cards as well as the credit or monetary balances to facilitate the settlement process for approved purchases.

Figure 11:
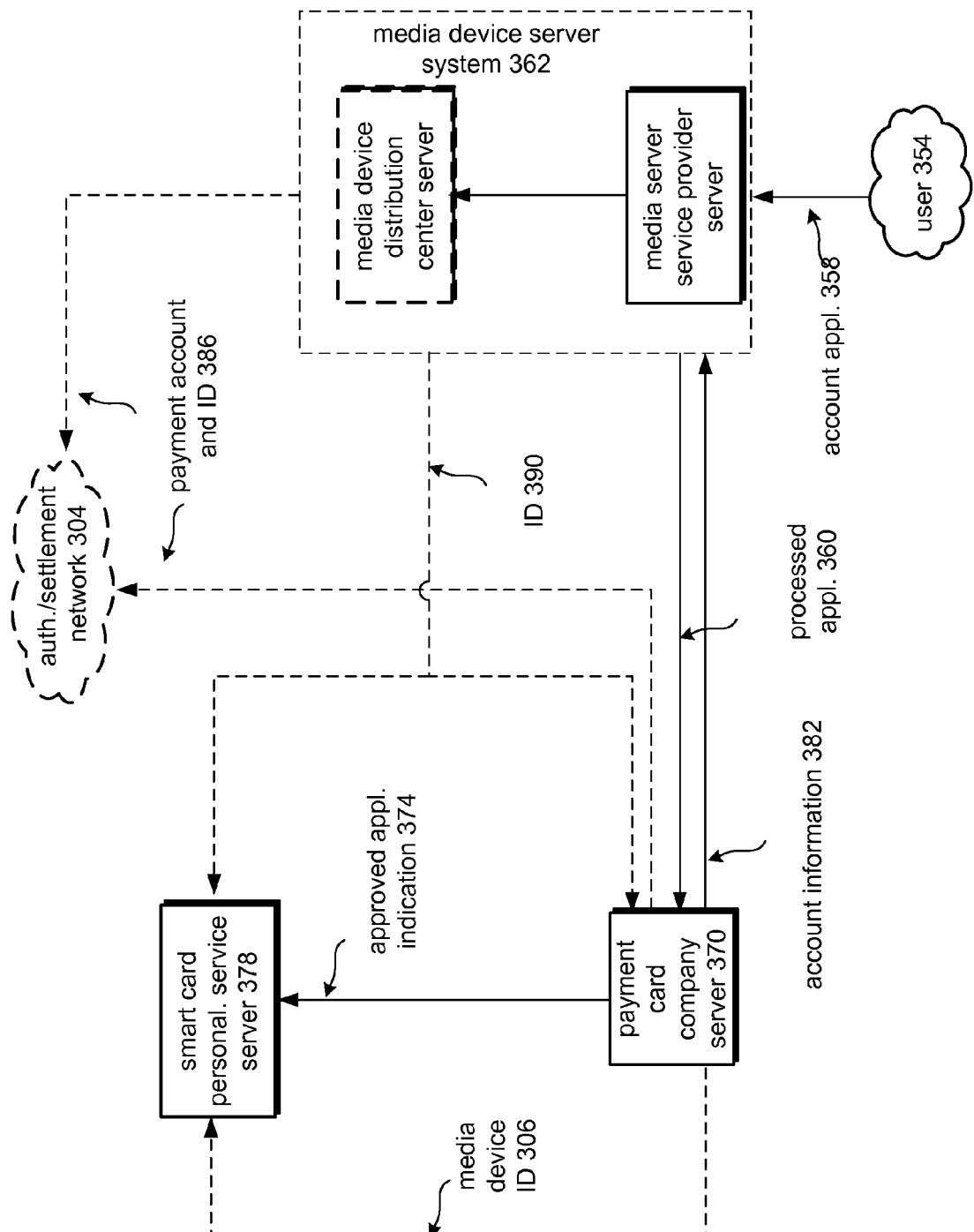
FIG. 11 is a functional block diagram of a computer network that includes a payment card company server operable to support creating an established association between a payment account and a media device according to one embodiment of the invention.

FIG. 11 is a functional block diagram of a computer system 350 that includes a payment card company server operable to support creating an established association between a payment account and a media device according to one embodiment of the invention. A user 354 provides a media device payment account application 358 to media device server system 362 for a payment account for use in association with a media device such as media device 14. As may be seen, media device server system 362 may include both a media server and a media device distribution center server. The functionality of these two servers may readily be rearranged or distributed across a different number of servers or may even be combined into one server. Each such embodiment is represented by media device server system 362. Each of the described embodiments may be similarly modified.

Media device server system 362 is operable to generate a media device payment account processed application 360 in an electronic form to payment card company server 370. As before, payment card company server 370 is a server that is in operable, among other tasks, to initiate a payment card and account generation process. Moreover, payment card company server 370 can comprise any of the embodiments of payment card company server system 204 of FIG. 8. Stated differently, server 370 may comprise a single module similar to server 314 of FIG. 10 or a plurality of modules similar to servers 258 and 266 of FIG. 9.

Payment card company server 370 is then operable to generate message 374 which includes a media device approved application indication to smart card personalization service server 378 to facilitate creation of a smart card for a payment account. The media device payment account approved application indication of message 374 includes a user 354 mailing address as well as additional user 354 payment account information Payment card company server 370 generates message 382 which includes media device payment account information to media device server system 362. The media device payment account information of message 382 may comprise an indication that the account is approved. Message 382 comprises at least some of the payment account information to allow media device server system 362 to perform an initial authorization for a user selected charge using the "pay it now" feature described previously. Generally, references to transmitting payment account information include transmitting any portion of the payment account information including all of the payment account information that is stored within or received by a device.

Additionally, in one embodiment, media device server system 362 then produces message 386 which includes media device payment account and the media device ID to authorization and settlement network elements of authorization and settlement network 304. Media device server system 362 is also operable to provide message 390 which includes the media device ID to payment card company server 370 to allow payment card company server 370 to take one or more subsequent steps to create the established association between the media device ID 390 (and therefore the associated media device) and the user 354 payment account. In one embodiment, media device server system 362 is further operable to provide message 390 which includes the media device ID directly to smart card personalization server 378 to enable the generation of smart cards having not only payment account information, but also the media device ID.

Figure 12:
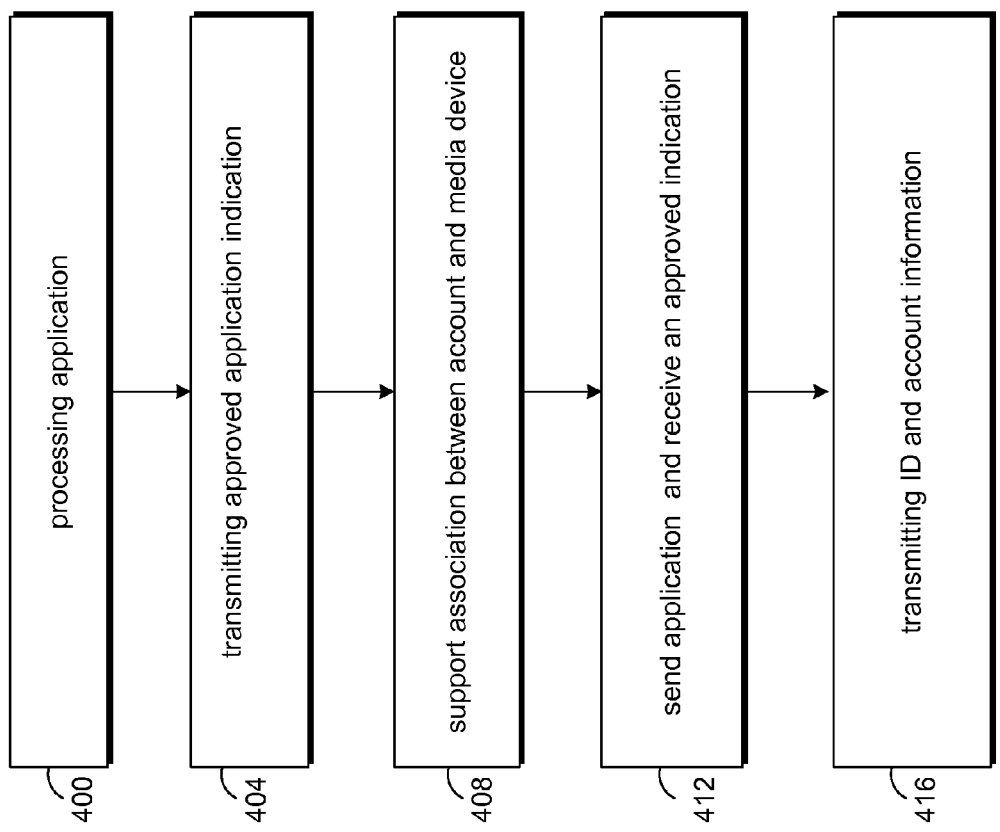
FIGS. 12-15 are flow charts that illustrate method steps for a payment account according to a plurality of embodiment of the invention.

FIG. 12 is a flow chart that illustrates a method for a payment account according to one embodiment of the invention. The method initially includes receiving and processing an application for a media device associated payment account (step 400). Thereafter, the method includes transmitting an approved application indication to a remote server to initiate a payment card generation process (step 404). Additionally, the method also includes taking one or more steps supporting an established association between the payment account and the media device (step 408). Such steps include storing and/or transmitting payment account information in relation to the authorized media device ID.

The method also includes, in one embodiment, receiving the application and generating the processed application to a financial institution server and subsequently receiving an approved indication from the financial institution server (step 412). Finally, the method includes determining and transmitting a media device identification number (ID) and at least a portion of the media device associated payment account information to at least one device or element of a transaction authorization and settlement network to support the authorization of transactions based in part upon the media device ID (step 416).

Figure 13:
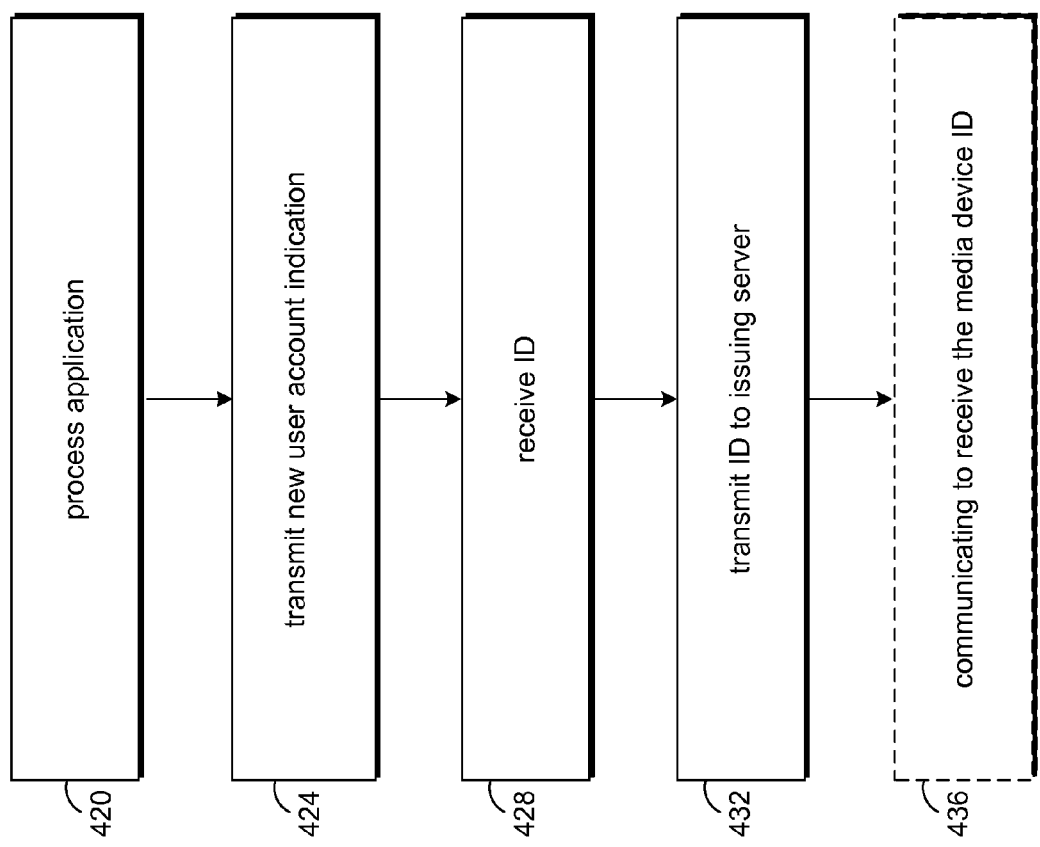

FIG. 13 is a flow chart that illustrates a method for a payment account according to one embodiment of the invention. The method steps of FIG. 13 include, receiving the payment account application, and generating an approved application indication to a smart card personalization service server (step 420). After the account is approved, the method further includes transmitting a media device new user account indication to a media device service provider server (step 424). The method also includes receiving a media device identifying number (step 428). The ID may be received from any one of a number of servers including the media server service provider, a payment card company server or other source. Thereafter, the method includes transmitting the media device identifying number to the smart card issuing server to support an established association with the payment account (step 432). The media device identifying number is an unalterable identifying number such as a serial number of a hardware device or software module.

The method includes an optional step of communicating with the media device or a smart card installed in the media device to receive the media device identifying number (step 436). A secure connection is established with either the media device or with the smart card installed in the media device to enable the payment card processing server to receive the media device ID directly from the media device or the smart card installed in the media device. This step may further include determining an encryption key for data, especially payment account information that is to be transmitted by the media device with a purchase selection indication.

Figure 14:
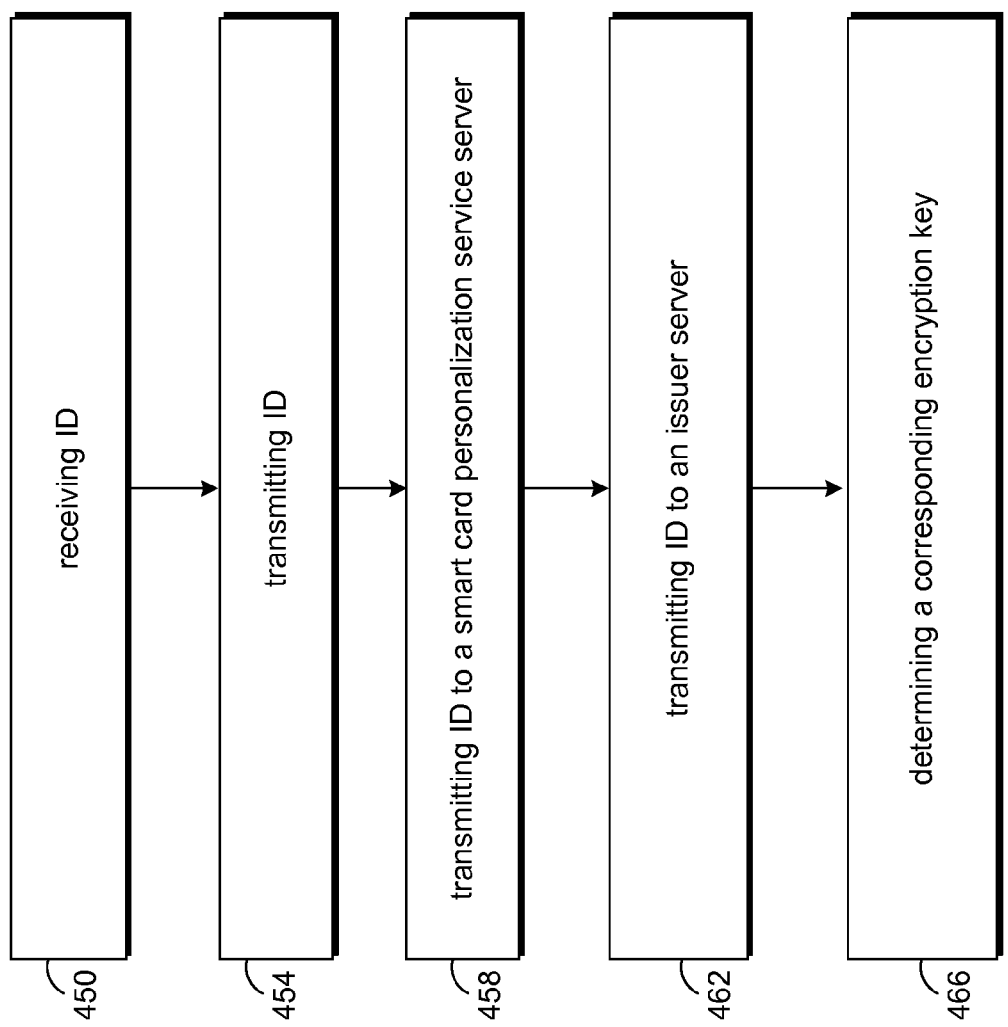

FIG. 14 is a flow chart that illustrates a method for a payment account according to an alternate embodiment of the invention. The method initially includes receiving a media device identifying number (step 450). The media device number may be received by way of an Internet connection with a remote user terminal through a communication module of the server, an input/output module of the server receiving user entries, and a communication link with the media device.

Thereafter, the method includes transmitting the media device identifying number to at least one financial network device to support creating an established association between the media device and the payment account (step 454). The method further transmitting the media device identifying number to a smart card personalization service server to support creating an established association between the media device and the payment account (step 458). The method also optionally includes transmitting the media device identifying number to an issuer server to support creating an established association between the media device and the payment account (step 462). Finally, one embodiment includes engaging in communications to determine an encryption key that corresponds to the established association between the media device and the payment account (step 466). More specifically, the encryption is for encryption a portion of data that is to be transmitted by an authorized media device having the established association with the payment account.

In one specific embodiment of the invention, the three secure methods for "personalizing" the remote control, an I/O device and a media device (for example, an IPTV set top box) with user payment account related data are provided. Generally, the three secure methods for personalizing the media device include pre-issuance personalization, personalization during installation, and post-issuance personalization. Pre-issuance personalization includes personalizing the media device with payment account information or data prior to either the payment card (e.g., a smart card) or the media device being shipped or delivered to the customer. Personalization during installation is a process wherein the device is personalized during the installation phase of the media device. Finally, post-issuance personalization is a process wherein a new card number is entered post installation or a card number is changed, added, or deleted post installation.

All three methods may require a payment card or account activation process prior to use of the payment functionality on the device. Activation will take place via traditional financial institution methods such as activation by phone, IVR or online activation. In all three personalization scenarios, the media device is assumed to contain a secure module, such as a smart card, tamper resistant module or secure access module (SAM). The device is also assumed to have the necessary slots or ports to insert a smart card or SAM. The secure module may hold an asymmetric key pair with a public key certificate and one or more diversified symmetric keys. In all personalization scenarios actual personalization data may be replaced with a message digest generated by a secure hash algorithm. The actual data can be reconstituted and verification of the message digest may be substituted in lieu of transmission or storage or the actual data.

Figure 15:
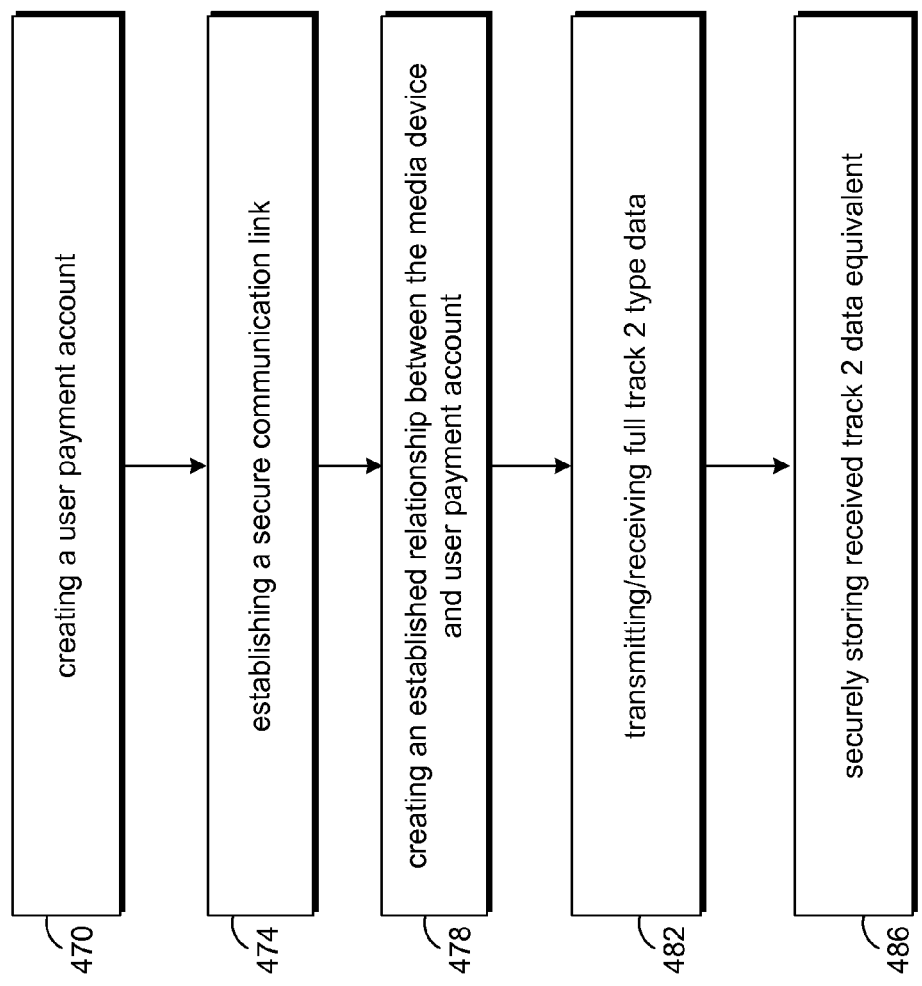

FIG. 15 is a flow chart that illustrates a method for personalizing a smart card for a media device according to one embodiment of the invention. In the two personalization scenarios described above wherein personalization occurs during installation or post delivery of either the media device or the smart card, a method is required for completing the setup for a media device that is to have an established association with a user payment account. The method includes creating a user payment account (step 470). The user payment account is one that is to be used for purchases made through the media device.

The method includes subsequently establishing a secure communication link for securely carrying data between a financial network server and a smart card module installed within the media device (step 474). The financial network server may be a server such as a financial institution server or a payment card processor server. The server and the media device (or smart card) communicate with each other to support the step of creating an established relationship between the media device and the user payment account (step 478).

From the perspective of the smart card or media device, this step includes transmitting a media device ID in relation to the payment account information to support creating the established relationship between the media device and the user payment account. From the perspective of the network server, this step includes receiving the media device ID in relation to the payment account information and storing and transmitting such information to other servers in the financial network to facilitate processing in which the media device ID for a purchase selection message may be compared to the payment account information as a part of approving and settling a purchase transaction. Such an ID, for example, may be mapped to an encryption key that is unique for each authorized media device.

The method further includes the financial institution server transmitting and the smart card and media device receiving full track 2 data equivalent of a magnetic strip of a payment card or a full set of personalization data for a contactless card (step 482) and the smart card securely storing the received track 2 data equivalent (step 486). Accordingly, when the user makes a purchase selection, a purchase selection message may include the payment account information (including the track 2 data equivalent). With the above method, a system may be updated to reflect a new account or piece of hardware.

Figure 16:
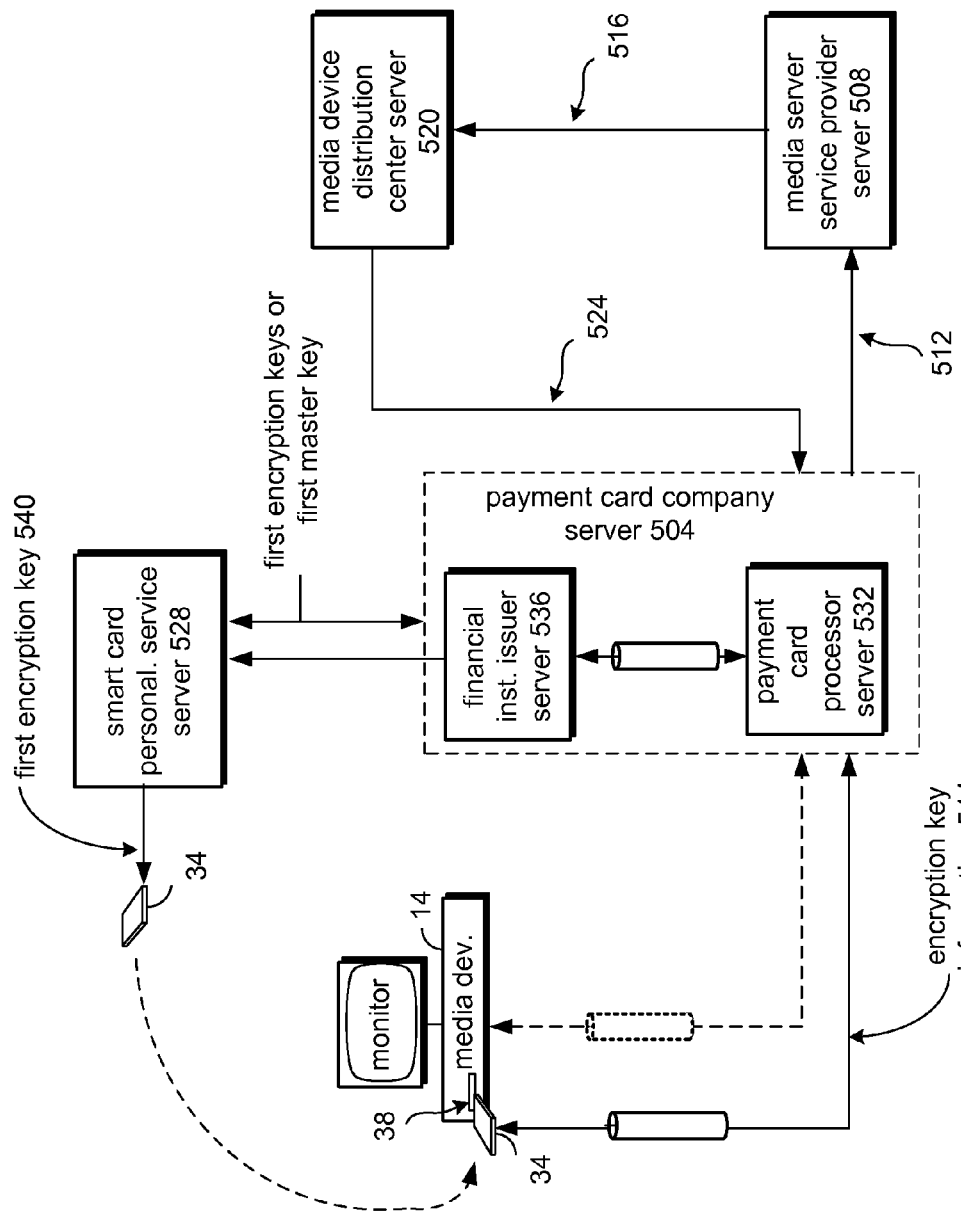
FIG. 16 is a functional block diagram of a computer system generates encryption keys according to one embodiment of the invention.

FIG. 16 is a functional block diagram of a computer system 500 that supports encryption key assignment according to one embodiment of the invention. Referring now to FIG. 16, payment card company server 504 is operable to communicate with a media server service provider server 508 by transmitting an order message 512 to initiate an order for media device 14 that is to be associated with a user payment account. Server 508 subsequently produces an order message 516 to media device distribution center server 520. The order messages 512 and 516 include user information and necessary payment account information such as the user name, mail, address, and account identifier. Media device distribution center server 520 then transmits message 524 containing a media device ID for media device 14 to payment card company server 504.

Payment card company server 504 then provides payment account information for the user payment account and the media device ID to smart card personalization service server 528 to support creating a smart card for the user payment account that is to be associated with media device 14. In one embodiment, the payment account information is encrypted with a first encryption key. The operation described above in relation to FIG. 16 is similar to and can comprise any of the variations of the prior described embodiments for associating a smart card or payment account with a media device and, in particular, FIGS. 3-15. The more detailed description of those figures is not repeated here. The encrypted tunnels described in relation to FIG. 8, for example, may be utilized here in FIG. 16 as well.

One or more of the messages and communications described thus far in relation to FIG. 16 may be through an encrypted tunnel as specifically shown in relation to 8. Any known technology for securing data packet transmissions through wired and wireless communication links may be included. All references to secure tunnels and/or secure communication channels should be understood to refer to encrypted and protected communications through at least one of a wired or wireless network and include transmissions of encrypted data through known data packet networks.

Payment card company server 504 includes at least one of a payment card processor server 532 and a financial institution issuer server 536. Generally, the various embodiments of network 500 and, more specifically, payment card company server 504 may include a single payment card processor server 532, a single financial institution issuer server 536, or both. In an embodiment that comprises both, payment card processor server 532 communicates with financial institution issuer server 536 over a secure tunnel or transmission path.

In a system in which payment card company server 504 includes only one server 532 or 536, either server 532 or 536 performs the same basic tasks of receiving and approving applications and supporting the creation of a smart card based user payment account that is to have an established association with a media device 14. Thus, it may be seen that either a payment card processor company, for example, Visa, Inc., or a financial institution such as a bank payment card issuer, may perform all of payment account application processing that has historically been performed jointly by both institutions.

One additional aspect of the embodiment of FIG. 16 is that smart card personalization service server 528 initially produces payment account information, received from server 504, in an encrypted form that is based upon a first encryption key to smart card 34 for storage within smart card 34 to support subsequent purchase transactions made through the associated media device which, here, is media device 14. Additionally, server 528 produces the first encryption key as shown at 540 to smart card 34 for storing in non-volatile memory. Subsequently, however, smart card 34 is operable to perform an encryption key rotation method to establish a second and unique encryption key that is based upon the media device ID of media device 14.

Specifically, once smart card is installed into media device 14 for a first time, smart card 34 is operable to initiate a secure communication shown at 544 through an encrypted tunnel based upon the first encryption key with payment card company server 504 to establish a second encryption key for either subsequent communications, for securing the payment account information, or for both. Encryption key information 544 includes any communication between smart card 34 (or media device 14) and server 504 to establish the second encryption key.

Generally, the first encryption key is derived using a first master key and a specified algorithm and is based upon at least one of the user payment account information and a hardware ID of the authorized media device 14 within which smart card 34 is to be installed. Yes, that works just fine although it is not a requirement for the first encryption key to be based on user payment a/c info. It could be based on the serial number of the smart card or any other suitable number. The trick here is that whatever the first encryption key is based on it will be replaced as correctly described by the second encryption key which IS based on the serial number/identifier of the device, thus linking the smartcard and the device to each other. Generally whatever the encryption key is based on can be sent in the clear and only with knowledge of the master key can mutual authentication or encryption take place. This is the key to the patent—it is the link between the smart card, the media device IPTV box serial number and the master key. In all smart card embodiments up till now, the cryptographic link has been between something on the smart card (such as payment account or smart card serial) and knowledge of the Master Key. This patent introduces a link between something on the media device (i.e serial number) the smart card and knowledge of the Master key. It becomes a 3 way tie instead of a 2 way tie. The first encryption key may be created either by smart card personalization service server 528, by media server service provider server 508, or another server such payment card company server 504. The first encryption key is therefore provided to smart card 34 to enable smart card 34 to subsequently communicate with server 504 through a secure tunnel.

To communicate with smart card 34, however, server 504 must also know the first encryption key. In one embodiment, server 504 receives and stores the first master key securely and, when given the media device ID and/or payment account information, is operable to generate the first encryption key using the same logic or algorithm originally used to generate the first encryption key for installation into smart card 34. In this embodiment, server 504 is operable to generate the first encryption key for each smart card 34 with which it will communicate to support smart card based purchase transactions for user payment accounts.

Generally, transmission of derivation data does not compromise security; Only knowledge of a master key compromises security. If, therefore, the first encryption key 540 is based on a smart card serial number and the Master key, the smart card 34 can send the smart card serial number of the (as derivation data) in the clear to server 504 (that has knowledge of the Master key) to enable server 504 to derive encryption key 1 (which is now a "shared secret"). Server 504 can then ask for the media device number through a communication protected by the first encryption key 540 and use Master Key 2 to derive a second (new) encryption key using the media device number as derivation data. Server 504 can transmit this new second encryption key through the protected communication link that is encrypted using first encryption key 540 thus completing the key rotation and creating the 3 way link between smart card, media device and Master key 2.

In one embodiment, the derivation data includes the smart card serial number and the media device ID. Using this derivation data for deriving the second encryption key prevents any decoupling of the device and the smart card, since the host would need to request data from both places in order to derive the encryption key. Alternately, server 504 receives and stores a plurality of first encryption keys, one for each supported user payment account and associated smart card 34 that is to be used through an associated media device for purchase transactions instead of deriving the first encryption keys for each smart card 34 as described above These stored first encryption keys may then be used to establish a secure communication to perform a key rotation to establish a second encryption key with each smart card 34.

To establish a second encryption key, therefore, smart card 34 initiates and establishes a secure tunnel with server 504 using the first encryption key stored in memory of smart card 34 for encryption operations (encrypting data, etc.). Server 504, in one embodiment, generates the second encryption key that is at least partially based upon the media device ID of media device 14 and transmits encryption key information associated with the second encryption key to smart card 34. In a first embodiment, the "encryption key information" comprises the second encryption key. Smart card 34 establishes the secure tunnel 504 to perform the key rotation when first placed into coupled communication with a media device 14.

In an alternate embodiment, the "encryption key information" includes a seed value enables smart card 34 to develop the second encryption key using a specified algorithm and, optionally, additional seed values. The received seed value is based in part on the media device ID of media device 14 which has an associated relationship with the user payment account that corresponds to the user payment account information. The second encryption key may be based on the same master key. In one embodiment, however, server 504 has or develops a second master key that is then used in combination with the media device ID to generate the second encryption key. In one or more embodiments, the second encryption key may be based upon a master key, a media device ID (for an authorized media device) and optionally, at least a portion of the payment account information for the user payment account.

While the embodiment of FIG. 16 is described in relation to smart card 34 performing the communication steps to generate the second encryption key, it should be understood that smart card 34 may communicate with and through media device 14 to reach remote servers or terminals through a communication tunnel. Accordingly, one or more messages and communication links described above may be between media device 14 and server 504. Along these lines, some of the encryption key rotation logic may be performed by media device 14 instead of smart card 34 in an alternate embodiment. Such communications are shown in dashed lines between media device 14 and server 504.

A smart payment card module such as smart card 34 includes structure similar to that of FIG. 4 and specifically includes a communication module coupled to at least one communication network directly or indirectly through a device such as media device 14 that is coupled to a communication network. Smart card 34 also includes a processing module coupled to the communication module and memory coupled to the processing module includes operational logic to support the aspects described in relation to FIG. 16 among others. Specifically, for example, the processing module, in cooperation with the communication module, is operable to receive and store a first encryption key and to receive and store payment account information for a user payment account encrypted with the first encryption key. The processing module is further operable to detect that the smart payment card module has been communicatively coupled to a media device. Such detection may be made, for example, through handshaking communication signals that are exchanged between coupled devices (which here includes the smart card 34 and media device 14) or other voltage or logic signals from which the processing module is able to identify or determine that the smart card 34 has been placed into coupled communication with the media device 14.

The processing module is further operable to identify an ID of media device 14. The ID is then provided by smart card 34 to a remote server using the first encryption key to create a secure tunnel to establish a second encryption key that is associated with the media device. Once the second encryption key is established, the processing module is operable to encrypt the payment account information with the second encryption key and to store the payment account information encrypted with the second encryption key.

In one specific embodiment, remote server 504 generates the second encryption key based on the media device ID received from smart card 34 and transmits the second encryption key to smart card 34 in relation to the payment account information. In an alternate embodiment, the smart card 34 processing module is operable to, by way of the communication module, receive a seed value generated by server 504 that based upon the media device ID and to generate the second encryption key using an algorithm that is at least partially to the one used by server 504 to generate the second encryption key.

In the above described communications between the processing module of smart card 34 and the remote server, e.g., server 504, it should be understood that such communications may occur by way of communication circuitry of media device 14 within which smart card 34 is installed (or with which is placed into coupled communication). Accordingly, the operations may include the processing module of smart card 34 producing transmission messages or signals to media device 14 for transmission to a payment card company server or other remote server through a secure tunnel to establish the second encryption key. The second encryption key is based upon the media device ID but may also be based upon any one of the first encryption key and the payment account information.

The processing module of smart card 34 is also operable to initiate secure communications to generate the second encryption key (e.g., a new encryption key) if the smart payment card module receives, through an encrypted communication, a control command from the remote server to establish a new encryption key.

Once the second or new encryption key is established, the processing module decrypts the payment account information with the first (or prior) encryption key and encrypts the payment account information with the second encryption key and then stores the payment account information. In one embodiment, credit card track 2 type of payment account information is encrypted with the second encryption key that is based upon the media device ID.

Figure 17:
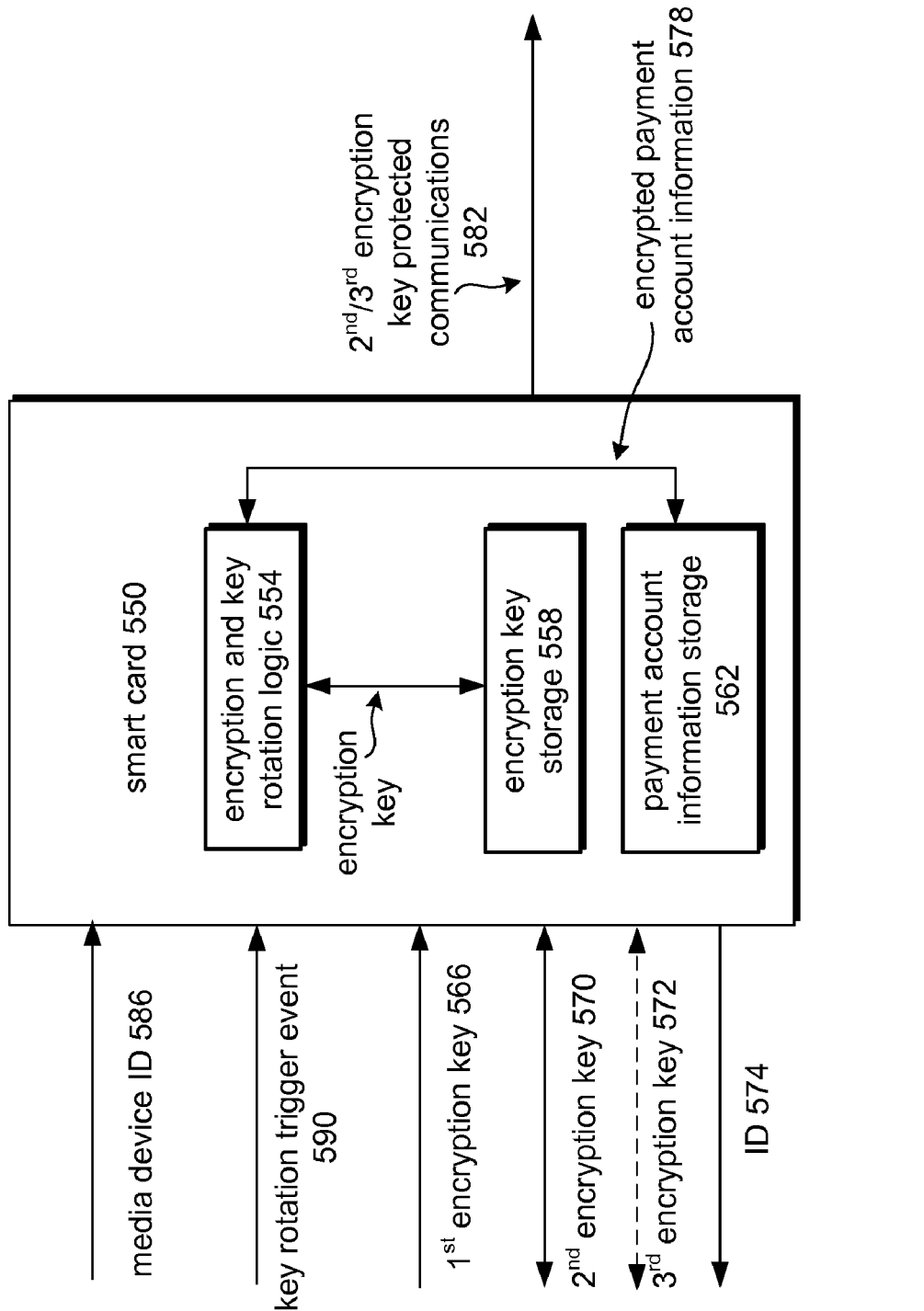
FIG. 17 is a functional block diagram of a smart card that uses a plurality of encryption keys to protect financial data according to one embodiment of the invention.

FIG. 17 is a functional block diagram of a smart card according to one embodiment of the invention. Smart card 550, which includes structure similar to FIG. 4, further includes encryption and key rotation logic 554 that define encryption and key rotation operations and communications. Smart card 550 also includes encryption key storage 558 for storing one or more encryption keys (e.g., first and second (and optionally, third) encryption keys), and payment account information storage 562 for storing payment account information.

In operation, smart card 550 receives and stores encryption keys through secure communications. For example, first encryption key 566 is received by smart card 550 within a secure facility from direct coupling to personalization service server 528 while a second encryption key 570 is received through a secure communication link or tunnel that uses first encryption key 566 for encrypting communications in the first communications tunnel. Smart card 550 further receives and stores payment account information while directly coupled to server 528 and subsequently through encrypted communications based on either the first encryption key 566 or second encryption key 570. In one embodiment, smart card 550 also receives a third encryption key 572 for further securing payment account information. The third encryption key 572 may be received at the same time that the second encryption key 570 is established or received or it may be received through a subsequent or even a prior communication/download. In an embodiment in which a third encryption key 572 is received, smart card 550 uses the third encryption key for encrypting non-track 2 type payment card information. Alternatively, the third encryption key 572 is used by the smart card or media device 14 to encrypt all payment account information (including the information encrypted with the second encryption key to further encrypt the information). In this embodiment, the third encryption key is used to establish a secure tunnel with a target server or terminal while the second encryption key is used to encrypt specified payment account information.

To support establishing second encryption key 570, smart card 550 transmits ID 574 of the media device 14 to a remote server. Thus, once ID 574 is transmitted and a new or second encryption key 570 is received or established, encryption and key rotation logic 554 of smart card 550 receives payment account information from storage 562 and decrypts the payment account information using the first encryption key 566. Thereafter, encryption and key rotation logic 554 encrypts at least a portion of the payment account information using second encryption key 570 and stores the encrypted payment account information encrypted with the second encryption key in storage 562. The process of receiving the payment account information encrypted with the first encryption key and then storing the payment account information using the second encryption key as shown at 578. Additionally, the second key is stored in storage 558. Subsequently, smart card 550 engages in communications that include payment account information encrypted using encryption key 570.

These communications include, for example, track 2 type payment account information data that has been stored using encryption key 570.

To facilitate the operations of FIG. 17, smart card 550 includes logic to identify the media device ID with which smart card 550 is communicatively coupled. For example, in one embodiment, smart card 550 transmits an ID request to the media device with which it is communicatively coupled. In an alternate embodiment, such ID is received as a part of established hand shaking procedures that are initiated as soon as smart card 550 and the media device are communicatively coupled. In both cases, identifying the ID or receiving the media device ID is shown at 586.

The key rotation process is initiated upon identifying a key rotation trigger event 590. The mere hand shaking that occurs when smart card 550 is communicatively coupled with a media device may be a defined trigger event to prompt smart card 550 to initiate the key rotation process to receive and use a new or second encryption key that is based upon the media device ID. Alternatively, a trigger even may comprise a command that is received through a secure communication with a remote server. In one specific embodiment, the encryption and key rotation logic 554 includes logic to initiate the key rotation only the first time smart card 550 is communicatively coupled to a media device. Thereafter, key rotation is only initiated upon receiving a control command through a secure channel or communication link to initiate key rotation.

Figure 18:
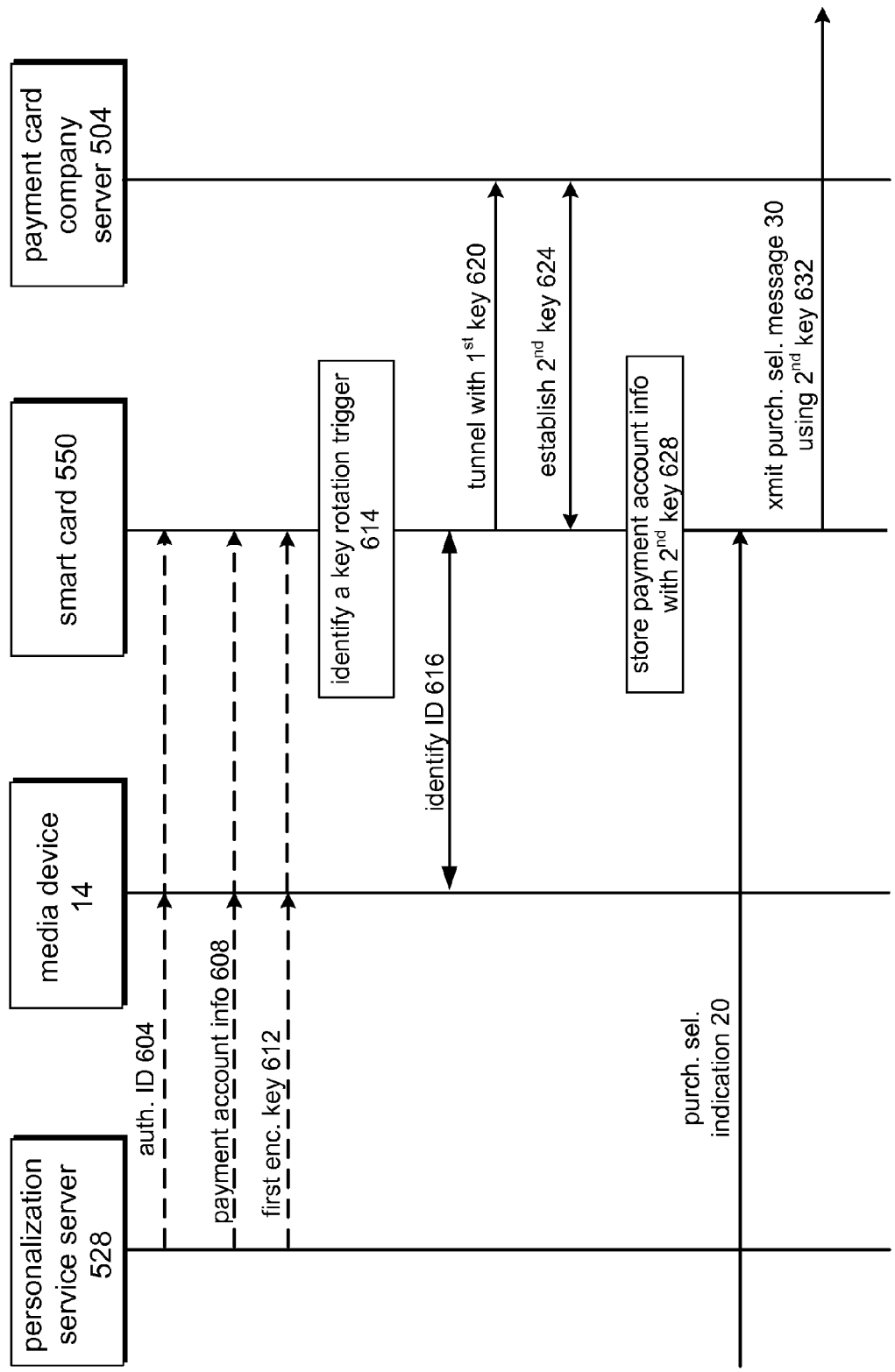
FIG. 18 is a signal flow diagram of a system that operates according to one embodiment of the invention.

FIG. 18 is a signal sequence diagram that illustrates operation according to one or more embodiments of the invention. A system 600 includes a personalization service server 528, a media device 14, a smart card 550, and a payment card company server 504. Server 528 produces an authorized ID 604 and payment account information 608 for a user payment account for a media device such as media device 14 that has (will have) an established association with the user payment account to smart card 550. Server 528 is operable to produce the authorized ID 604 and payment account information 608 to smart card 550 by way of media device 14 in system 600. In one embodiment, server 528 produces the payment account information encrypted with a first encryption key 612. Server 528 further produces first encryption key 612 to smart card 550. Each of these operations occurs in a secure facility in which smart card 550 is coupled to server 528.

Thereafter, smart card 550 identifies a key rotation trigger event 614. The key rotation trigger event 614 comprises either a received command or an installation or coupling of smart card 550 to a media device. In one embodiment, only a first coupling to or installation in a media device may operate as a trigger event 614. After identifying trigger event 614, smart card 550 identifies the media device ID 616 and communicates through a secure communication link or tunnel that is based upon the first encryption key 620 to establish a second encryption key 624. Specifically, smart card 550 transmits ID 614 to server 504 in a first embodiment to enable server 504 to generate the second encryption key 624 and to transmit second encryption key 624 to smart card 550. The payment account information is then stored using the second encryption key 624 as shown at 628. It should be understood that identifying the ID 616 may also occur before identifying a key rotation trigger event 614.

Once the second encryption key 624 is established, the payment account information is stored by smart card 550 using second encryption key 624 as shown at 628. At this point, smart card 550 is ready for use to support purchase transactions. When smart card 550 receives a purchase selection indication 20 generated, for example, by a remote control, smart card 550 transmits purchase selection message 30 that includes the payment account information encrypted with the second encryption key 624 as shown at 632.

A downstream device or server that receives the payment account information that is encrypted with the second encryption key 624 then determines that a media device is an authorized media device if an encryption key that is mapped to the media device ID of the media device 14 that transmitted the payment account information is one that successfully decrypts the encrypted payment account information. Stated differently, second encryption key 624 is only mapped in a mapping table to one media device ID (the authorized media device having an established association with the user payment account). Accordingly, by using a media device ID of a media device that transmits purchase selection message 30 as an entry to the mapping table, encryption key 624 is only selected if the ID is for an authorized media device.

FIG. 19 is a flow chart illustrating a method for key rotation according to one embodiment of the invention. The method includes receiving and storing a first encryption key in a smart card memory (step 700). The method also includes receiving and storing payment account information for a user payment account encrypted with the first encryption key in the smart card memory (step 704). The method further includes detecting that the smart payment card module has been communicatively coupled to a media device for a first time and identifying an ID of the media device (step 708). Communicative coupling occurs when the smart card is installed into a receiving port, dock or station of media device 14 or, alternatively, is coupled by a communication link to support described operations. Such a communication link may be any known type of link including wired links (e.g., a USB link or a FireWire™ link) or a wireless link (e.g., a Bluetooth™ link, a radio frequency identification (RFID) link, etc).

In one embodiment, one trigger event for initiating a key rotation process is determining that the smart payment card module has been communicatively coupled to a media device for a first time. If the described method is being performed at least in part by the media device, the step of identifying the ID may involve no more than retrieving the ID from memory. If the method is being performed by the smart payment card module coupled to the media device, the method includes communicating with the media device to receive the media device ID.

Thereafter, once a trigger event has occurred, the method includes creating a secure tunnel using the first encryption key with a remote server (step 712). The remote server may be, for example, any described embodiment of a payment card company server. Once the secure tunnel is established with the remote server, the method includes establishing a second encryption key that is associated with the media device (step 716).

In one specific embodiment, establishing the second encryption key includes providing or transmitting the media device ID to the remote server and subsequently receiving the second encryption key through the secure tunnel using the first encryption key. Here, the second encryption key is generated by the remote server using a specified algorithm, a master key, the media device ID and, in one embodiment, the payment account information. Alternatively, the remote server generates a seed that is received and used as an input to a second specified algorithm to generate the second encryption key once the seed is received. Here, the seed is generated by a specified algorithm by the remote server and is based on a master key and the media device ID.

Once the second encryption key is established, the method includes storing the payment account information in an encrypted format using the second encryption key (step 720).

This step specifically includes retrieving the payment account information, decrypting it using the first encryption key, encrypting it using the second encryption key and then storing it. The step includes, in one embodiment, encrypting credit card track 2 types of data with the second encryption key that is based upon the media device ID.

The above described method is performed by a smart card in one embodiment and at least in part by the media device in another embodiment in cooperation with the smart card wherein the smart card and media device operate as a single unit. Here, the method includes the media device receiving the second encryption key in relation to the payment account information from the remote server after being generated by the remote server. The second encryption key may be based on both the media device ID and the payment account information in one embodiment. Generally, in one embodiment, the method includes initiating and performing the steps for key rotation to generate a second encryption key that is based on the media device ID if:

the smart payment card module has been communicatively coupled to any media device only once and has recently been communicatively coupled to the media device; or the smart payment card module (or media device/smart card combination) receives, through an encrypted communication, a control command from the remote server to generate a new encryption key based upon the media device ID.

For each of the described embodiments, one trigger event for initiating a key rotation to generate a new or second encryption key based on the media device ID is the smart card being communicatively coupled to the media device (for a first time). In alternate embodiments, different logic may be used to trigger the key rotation once the smart card and the media device are coupled. For example, the key rotation process may be initiated each time the media device is coupled to the smart card wherein logic in the remote server makes a determination whether to rotate the encryption key. In yet another embodiment, a key rotation occurs each time the media device and smart card are coupled assuming criteria specified within the remote server are satisfied and a new or second encryption key may be provided.

For each embodiment, however, one aspect is that of determining that the smart card and media device have been coupled. Such a determination may be made by the smart card, for example, when: a power pin receives or becomes coupled to a supply voltage from an external source; an input pin receives a specified logic or voltage signal; a specified message or signal is received at a specified pin; a handshaking procedure is initiated by the media device; or any other known method for determining that such a coupling has just occurred.

FIG. 20 illustrates a method in a media device for key rotation according to one embodiment of the invention. Initially, the method includes determining that a smart card has been communicatively coupled to the media device and communicating with the smart card through a smart card interface to receive a first encryption key from the smart card (step 750). Thereafter, the method includes establishing a first secure communication tunnel with a first remote server using the first encryption key (step 754). Once the first secure communication tunnel is established, the method includes receiving a second encryption key through the first secure communication tunnel with the first remote server and providing the second encryption key to the smart card (step 758). The second encryption key is used to protect a portion of the payment account information. A different portion may be transmitted either in an unprotected form or protected by a third encryption key. Here, the third encryption key may be used to encapsulate and protect all of the payment account information including further encrypting the data protected with the second encryption key or merely protecting data not protected with the second encryption key.

Thus, after receiving a purchase selection indication from a remote control device and retrieving payment account information from the smart card wherein the payment account information is encrypted with the second encryption key, the method includes establishing a second secure communication tunnel with a second remote server using one of the second encryption key or a third encryption key (step 762). With either approach, the method further includes producing the payment account information encrypted with the second encryption key to the second external server (step 766). Optionally, therefore, the method also includes transmitting unencrypted information to a second server (e.g., media server or a merchant server) that relates to a specific purchase transaction in purchase selection message 30 or that relates to the payment account information (step 770).

As a part of establishing the second encryption key, the method includes the media device producing a media device ID to one of the first remote server and the smart card. For transmissions that include the use of a third encryption key, the method includes receiving the third encryption key for use as a part of creating the second secure communication tunnel. Thus, in such an embodiment, the method further includes transmitting a first portion of the payment account information encrypted with the second encryption key and a second portion of the payment account information encrypted with the third encryption key. More specifically, the second encryption key is used to encrypt credit card track 2 type of payment account information for a user payment account. Here, the second encryption key is based upon the media device ID for a media device having an established association the user payment account. The third encryption key may also be used to further encrypt the credit card track 2 types of data that is protected with the second encryption key in addition to other information or data. For the described communications, the first and second remote servers may be the same server (e.g., the payment card company server) or different (the payment card company server is the first remote server and a media server, a payment card management server or any other server including a merchant server is the second remote server.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof. For example, each device, server or system described in relation to the Figures in the present specification may include, in one or more embodiments, one or more of the structural elements in a configuration similar to that of device 130 of FIG. 4 to support associated operations and communications as described in relation to the various figures.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a message but may adjust its current level, voltage level, and/or power level. As may further be used herein, inferred coupling (i.e., where one element is coupled to another element by inference) includes direct and indirect coupling between two items in the same manner as "coupled to." As may even further be used herein, the term "operable to" indicates that an item includes one or more of power connections, input(s), output(s), etc., to perform one or more its corresponding functions and may further include inferred coupling to one or more other items. As may still further be used herein, the term "associated with," includes direct and/or indirect coupling of separate items and/or one item being embedded within another item. As may be used herein, the term "compares favorably," indicates that a comparison between two or more items, messages, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

What is claimed is:

1. A smart payment card module, comprising:
 a communication module coupled to at least one communication network;
 a processing module coupled to the communication module; and
 a memory coupled to the processing module;
 wherein the processing module, in cooperation with the communication module, is programmed to:
 receive and store a first encryption key;
 receive first encrypted user payment account information, the first encrypted user payment account information having been generated by encrypting user payment account information using the first encryption key;
 store the first encrypted user payment account information;
 detect that the smart payment card module has been communicatively coupled to a media device;
 identify an ID of the media device;
 establish a secure communication path with a remote server using the first encryption key;
 communicate the ID of the media device to the remote server;
 receive a second encryption key that is based on the ID of the media device;
 decrypt the first encrypted user payment account information using the first encryption key to generate the user payment account information;
 encrypt a portion of the user payment account information using the second encryption key to generate second encrypted user payment account information; and
 store the second encrypted user payment account information.

2. The smart payment card module of claim 1 wherein the processing module is further programmed to generate a message including the second encrypted user payment account information for transmission to a payment card company server.

3. The smart payment card module of claim 1 wherein the processing module is further programmed to receive a third encryption key and provide the third encryption key to the media device for establishing a secure tunnel for transmitting a purchase selection message.

4. The smart payment card module of claim 1 wherein the second encryption key is based on both the ID of the media device and at least a portion of the user payment account information.

5. The smart payment card module of claim 1 wherein the processing module is further programmed to initiate a key rotation to establish the second encryption key if:
 the smart payment card module has determined that it has been communicatively coupled to the media device and that it has been communicatively coupled to any media device only once; or
 the smart payment card module receives, through an encrypted communication, a control command from the remote server to establish a new encryption key based upon the ID of the media device.

6. The smart payment card module of claim 1 wherein the user payment account information includes credit card track 2 type of payment account information encrypted using the second encryption key.

7. A method for key rotation, comprising, by a smart payment card module:
 receiving and storing a first encryption key;
 receiving first encrypted user payment account information, the first encrypted user payment account information having been generated by encrypting user payment account information using the first encryption key;
 detecting that the smart payment card module has been communicatively coupled to a media device for a first time;
 identifying an ID of the media device;
 creating a secure tunnel with a payment card company server using the first encryption key;
 communicating the ID of the media device to the payment card company server;
 decrypting the first encrypted user payment account information using the first encryption key to generate the user payment account information;
 receiving a second encryption key from the payment card company server, the second encryption key being based at least in part on the ID of the media device;

encrypting at least a portion of the user payment account information with the second encryption key to generate a second encrypted user payment account information; and storing the second encrypted user payment account information.

8. The method of claim 7 wherein the second encryption key is based on both the ID of the media device and at least a portion of the user payment account information.

9. The method of claim 7 wherein the second encryption key is used for encrypting a specified portion of the user payment account information.

10. The method of claim 7 further including:

receiving a third encryption key for:

encrypting non-track 2 type of user payment account information in purchase selection messages; or encrypting the encrypted user payment account information using the third encryption key.

11. The method of claim 10 wherein the third encryption key is communicated to the media device.

12. The method of claim 7 further including communicating messages to the media device for transmission to a payment card company server to establish the second encryption key.

13. The method of claim 7 wherein the user payment account information is encrypted with the first encryption key prior to storing and prior to initiating the key rotation to establish the second encryption key.

14. The method of claim 7 further including initiating the key rotation process to establish the second encryption key based on the media device ID when:

the smart payment card module has determined that it has been communicatively coupled to a media device and that it has been communicatively coupled to any media device only once; or the smart payment card module receives, through an encrypted communication, a control command from the payment card company server to initiate generation of a new encryption key based upon the media device ID.

15. The method of claim 13 further including decrypting the user payment account information using the first encryption key prior to storing the user payment account information.

16. The method of claim 9 further including encrypting credit card track 2 type of data with the second encryption key.

* * * * *